(12) United States Patent
Sakai

(10) Patent No.: US 10,171,273 B2
(45) Date of Patent: Jan. 1, 2019

(54) DECISION FEEDBACK EQUALIZER AND INTERCONNECT CIRCUIT

(71) Applicant: FUJITSU LIMITED, Kawasaki-shi, Kanagawa (JP)

(72) Inventor: Yasufumi Sakai, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/891,414

(22) Filed: Feb. 8, 2018

(65) Prior Publication Data

US 2018/0241592 A1 Aug. 23, 2018

(30) Foreign Application Priority Data

Feb. 17, 2017 (JP) ................................. 2017-027645

(51) Int. Cl.
| | | |
|---|---|---|
| *H03H 7/30* | (2006.01) | |
| *H04L 25/06* | (2006.01) | |
| *H04L 25/49* | (2006.01) | |
| *H04L 25/03* | (2006.01) | |

(52) U.S. Cl.
CPC ...... *H04L 25/063* (2013.01); *H04L 25/03267* (2013.01); *H04L 25/4917* (2013.01); *H04L 25/03057* (2013.01)

(58) Field of Classification Search
CPC ....... H04L 25/03057; H04L 2025/0349; H04L 27/01; H04L 2025/03363; H04B 14/026; H04B 14/023
USPC ........................... 375/233, 229; 708/322, 323
See application file for complete search history.

(56) References Cited

U.S. PATENT DOCUMENTS

| | | | |
|---|---|---|---|
| 9,159,355 B1* | 10/2015 | Sekigawa | ............... G11B 7/002 |
| 2009/0238301 A1 | 9/2009 | Cheung | |
| 2017/0054575 A1* | 2/2017 | Sakai | ................. H04L 25/03057 |
| 2018/0097669 A1* | 4/2018 | He | ........................ H04B 14/023 |

FOREIGN PATENT DOCUMENTS

JP           2009-231954       10/2009

OTHER PUBLICATIONS

Peter Park, "A 4PAM/2PAM Coaxial Cable Receiver Analog Front-End Targeting 40Gb/s in 90-nm CMOS," pp. 1-101 (113 pages), 2008.
Sam Palermo, "ECEN689: Special Topics in High-Speed Links Circuits and Systems, Spring 2010," Class Notes Lecture 19:RX DFE Equalization, Texas A&M University, pp. 1-19 (19 pages), Spring 2010.
Takayuki Shibasaki, et al., "A 56-Gb/s Receiver Front-End with a CTLE and 1-Tap DFE in 20-nm CMOS", IEEE 2014 Symposium on VLSI Circuits Digest of Technical Papers, pp. 112-113 (2 pages), Jun. 2014.

* cited by examiner

*Primary Examiner* — Khai Tran
(74) *Attorney, Agent, or Firm* — Fujitsu Patent Center

(57) ABSTRACT

There is provided a decision feedback equalizer including a comparison circuit configured to compare a value indicated as $2^n$ of a pulse amplitude modulated signal with a threshold value, wherein n is an integer of 2 or more, a latch circuit configured to retain data of a comparison result of the comparison circuit, a decoder configured to decode the retained data by the latch circuit, and a setting circuit configured to set the threshold value based on the retained data fed back from the latch circuit.

16 Claims, 28 Drawing Sheets

FIG. 11

| LEVEL OF INPUT DATA SIGNAL | DECISION THRESHOLD TO BE SET IN NEXT EVALUATION PERIOD | LATCH OUTPUT (POSITIVE SIDE) | | | SWITCH STATE (NEGATIVE SIDE) | | | SWITCH STATE (POSITIVE SIDE) | | | DECISION THRESHOLD TO BE SET IN NEXT EVALUATION PERIOD |
|---|---|---|---|---|---|---|---|---|---|---|---|
| | | LATCH #1 | LATCH #1 | LATCH #1 | SW1_N | SW2_N | SW3_N | SW1_P | SW2_P | SW3_P | |
| 3 | $V_{ref} + 3 \cdot \Delta$ | 1 | 1 | 1 | off | off | off | ON | ON | ON | $V_{ref} + 3 \cdot \Delta$ (3·ON - 0·ON) |
| 2 | $V_{ref} + 1 \cdot \Delta$ | 0 | 1 | 1 | ON | off | off | off | ON | ON | $V_{ref} + 1 \cdot \Delta$ (2·ON - 1·ON) |
| 1 | $V_{ref} - 1 \cdot \Delta$ | 0 | 0 | 1 | ON | ON | off | off | off | ON | $V_{ref} - 1 \cdot \Delta$ (1·ON - 2·ON) |
| 0 | $V_{ref} - 3 \cdot \Delta$ | 0 | 0 | 0 | ON | ON | ON | off | off | off | $V_{ref} - 3 \cdot \Delta$ (0·ON - 3·ON) |

FIG. 14
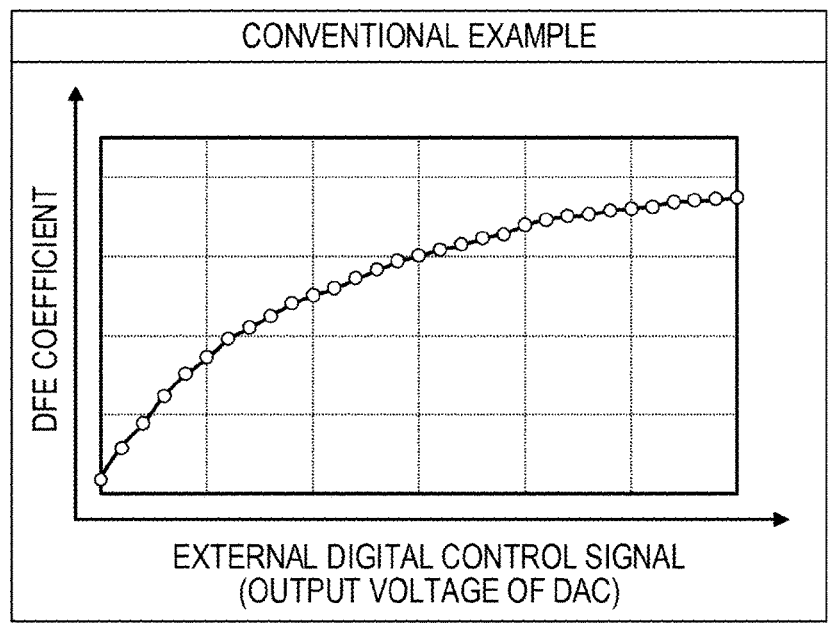
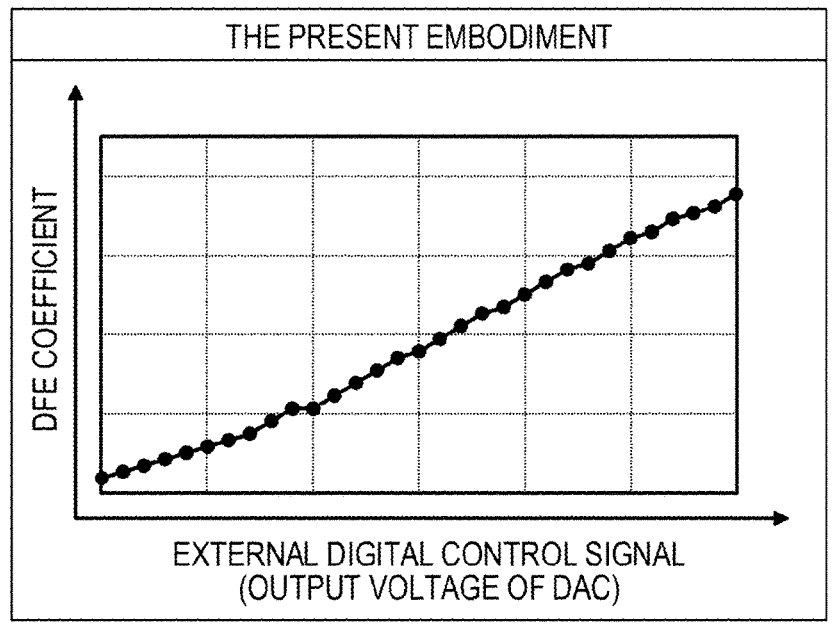

DECISION FEEDBACK EQUALIZER AND INTERCONNECT CIRCUIT

CROSS-REFERENCE TO RELATED APPLICATION

This application is based upon and claims the benefit of priority of the prior Japanese Patent Application No. 2017-027645, filed on Feb. 17, 2017, the entire contents of which are incorporated herein by reference.

FIELD

The embodiments discussed herein are related to a decision feedback equalizer and an interconnect circuit.

BACKGROUND

In recent years, in information processing apparatuses such as servers and computers, the performance (particularly bandwidth) of components such as a CPU (Central Processing Unit) and so on has greatly improved. In order to increase the total bandwidth of the entire information processing apparatus, it is often required to increase the speed of a transmission/reception circuit for transmitting and receiving data between chips such as CPUs, between a plurality of elements in a chip, or between a plurality of circuit blocks. In addition, it is often required to speed up the transmission/reception circuit for transmitting and receiving data between boards and between housings. In a transmission/reception circuit requiring high-speed data communication by electric communication or optical communication as described above, for example, a signal equalizer (equalizer) is used to compensate for deterioration of a data signal generated in a communication path.

One example of the equalizer is a decision feedback equalizer (DFE) (see, e.g., Non-Patent Document 1). The DFE is a circuit for compensating for signal deterioration due to inter-symbol interference (ISI) by subtracting the ISI from an input signal, which is input to a comparator in the state in which the ISI is superimposed thereon, by changing a decision threshold of the comparator. In order to compensate for the input data signal every bit, the DFE changes the decision threshold of the comparator every UI (unit-interval)) of a data width of 1 bit.

On the other hand, in recent years, in lieu of a transmission scheme based on binary modulation such as NRZ (Non Return to Zero), a standard for data communication based on quaternary pulse amplitude modulation (PAM) has been formulized. Hereinafter, the quaternary pulse amplitude modulation is sometimes referred to as "PAM4" and a quaternary pulse amplitude modulation signal is sometimes referred to as a "PAM4 signal". As a DFE for PAM4, there has been proposed a speculative DFE that feeds back a 2-bit output result output from a PAM4 decoder (see, e.g., Non-Patent Document 2).

Related techniques are disclosed in, for example, Japanese Laid-Open Patent Publication No. 2009-231954.

Related techniques are disclosed in, for example, Sam Palermo, ECEN689: Special Topics in High-Speed Links Circuits and Systems, Spring 2010, Class Notes Lecture 19, Texas A&M University (Non-Patent Document 1), Peter Park, "A 4PAM/2PAM coaxial cable receiver analog front-end targeting 40 Gb/s in 90-nm CMOS" (Non-Patent Document 2) and T. Shibasaki, et al., "A 56-Gb/s Receiver Front-End with a CTLE and 1-Tap DFE in 20-nm CMOS", IEEE Symp. VLSI Circuits, pp. 112-113, June 2014 (Non-Patent Document 3).

SUMMARY

According to an aspect of the invention, a decision feedback equalizer includes a comparison circuit configured to compare a value indicated as $2^n$ of a pulse amplitude modulated signal with a threshold value, wherein n is an integer of 2 or more, a latch circuit configured to retain data of a comparison result of the comparison circuit, a decoder configured to decode the retained data by the latch circuit, and a setting circuit configured to set the threshold value based on the retained data fed back from the latch circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a table illustrating an example of the relationship between an input data signal and a latch circuit and a switch circuit;

FIG. 14 is a graph illustrating an example of a change between an external control signal and a DFE coefficient;

DESCRIPTION OF EMBODIMENTS

In the technique of Non-Patent Document 2, since a PAM4 decoder is included in a feedback path (that is, since an output signal of the PAM4 decoder is fed back), a delay time when the signal passes through the feedback path (delay time of the feedback path) is increased. As a result, for example, it may be difficult for a reception device using a decision feedback equalizer to handle a higher data rate.

Hereinafter, an embodiment of a technique capable of reducing the delay time of the feedback path will be described with reference to the drawings.

<Interconnect Circuit>

Figure 1:
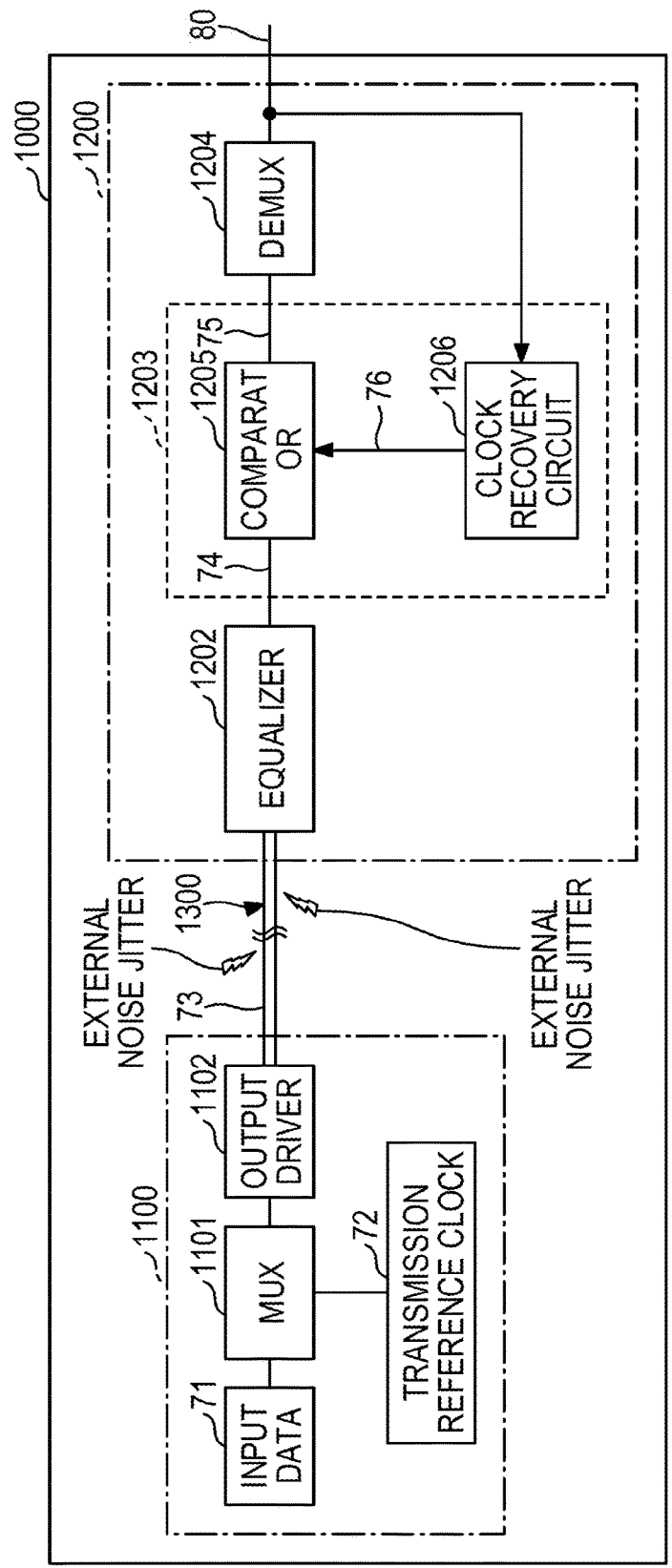
FIG. 1 is a block diagram illustrating an example of the configuration of an interconnect circuit according to an embodiment.

FIG. 1 is a block diagram illustrating an example of the configuration of an interconnect circuit 100. The interconnect circuit 1000 transmits data signals transmitted and received via a transmission line 1300 between a transmission device 1100 and a reception device 1200 by high-speed serial transmission. The interconnect circuit 1000 is an example of a transceiver circuit that transmits and receives data between chips such as CPUs, between a plurality of elements within a chip, or between a plurality of circuit blocks. The transmission line 1300 may be either a wired communication path or a wireless communication path.

The interconnect circuit 1000 includes the transmission device 1100, the reception device 1200, and the transmission line 1300. The transmission device 1100 and the reception device 1200 are connected by the transmission line 1300. The transmission device 1100 includes a multiplexer circuit (MUX) 1101 and an output driver 1102. The reception device 1200 includes an equalizer 1202, a reception processing unit 1203, and a de-multiplexer circuit (DEMUX) 1204. The reception processing unit 1203 includes a comparator 1205 and a clock recovery circuit (CR) 1206.

The output of the MUX 1101 that sets input data 71 according to a transmission reference clock 72 is input to the output driver 1102. The output driver 1102 transmits an output signal 73 to the reception device 1200 via the transmission line 1300. The output signal 73 is shaped by the equalizer 1202 and input to the comparator 1205.

The comparator 1205 compares an output signal 74 of the equalizer 1202 with a certain threshold and outputs reception data 75. The DEMUX 1204 converts the reception data 75 in a serial-parallel manner. The CR 1206 generates a clock signal 76 synchronized with the output signal 74 of the equalizer 1202 from an output signal 80 of the DEMUX 1204 and supplies the clock signal 76 to the comparator 1205.

The equalizer 1202 is an example of the decision feedback equalizer according to this embodiment. Hereinafter, the decision feedback equalizer according to the present embodiment will be described.

<Decision Feedback Equalizer>

Figure 2:
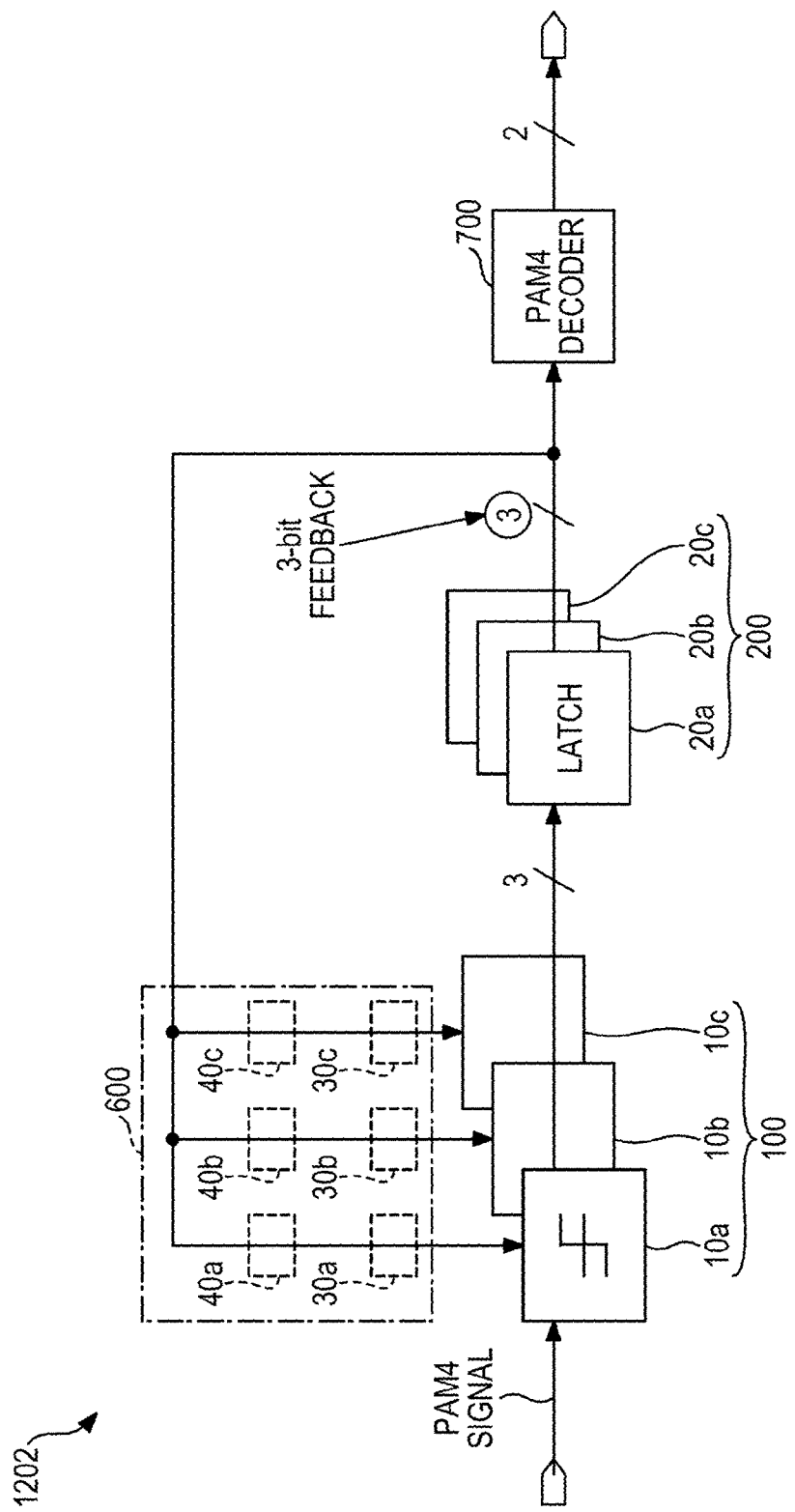
FIG. 2 is a diagram illustrating an example of the configuration of a decision feedback equalizer according to an embodiment.

FIG. 2 is a diagram illustrating an example of the configuration of the decision feedback equalizer according to the present embodiment. The equalizer 1202 illustrated in FIG. 2 is an example of a decision feedback equalizer that reduces the influence of ISI superimposed on a PAM4 signal input to the equalizer 1202. The equalizer 1202 includes a comparison circuit 100, a latch circuit 200, a decoder 700, and a setting circuit 600.

The comparison circuit 100 compares the PAM4 signal with a plurality of (in this case, three) decision thresholds. The comparison circuit 100 includes three comparators 10a, 10b, and 10c. The comparator 10a compares the PAM4 signal with a first decision threshold. The comparator 10b compares the PAM4 signal with a second decision threshold. The comparator 10c compares the PAM4 signal with a third decision threshold. The second decision threshold is smaller than the first decision threshold and the third decision threshold is smaller than the second decision threshold.

The latch circuit 200 latches the comparison result of the comparison circuit 100. The latch circuit 200 includes three latches 20a, 20b and 20c the number of which is the same as the number of comparators. The latch 20a latches the comparison result of the comparator 10a. The latch 20b latches the comparison result of the comparator 10b. The latch 20c latches the comparison result of the comparator 10c.

The decoder 700 decodes a latch output signal output from the latch circuit 200. The decoder 700 converts the latch output signal representing the 3-bit comparison result output from the three latches 20a, 20b and 20c into a 2-bit decoder output signal.

The setting circuit 600 sets the respective decision thresholds of the comparators 10a, 10b and 10c of the comparison circuit 100 based on the latch output signal fed back from the latch circuit 200. The setting circuit 600 includes three switch circuits 40a, 40b, and 40c and three threshold setting circuits 30a, 30b, and 30c.

The 3-bit latch output signals fed back from the latches 20a, 20b, and 20c are input to the switch circuits 40a, 40b, and 40c, respectively. The threshold setting circuit 30a sets the first decision threshold of the comparator 10a based on the 3-bit latch output signals fed back from the latches 20a, 20b, and 20c. The threshold setting circuit 30b sets the second decision threshold of the comparator 10b based on the 3-bit latch output signals fed back from the latches 20a, 20b, and 20c. The threshold setting circuit 30c sets the third decision threshold of the comparator 10c based on the 3-bit latch output signals fed back from the latches 20a, 20b, and 20c.

Figure 3:
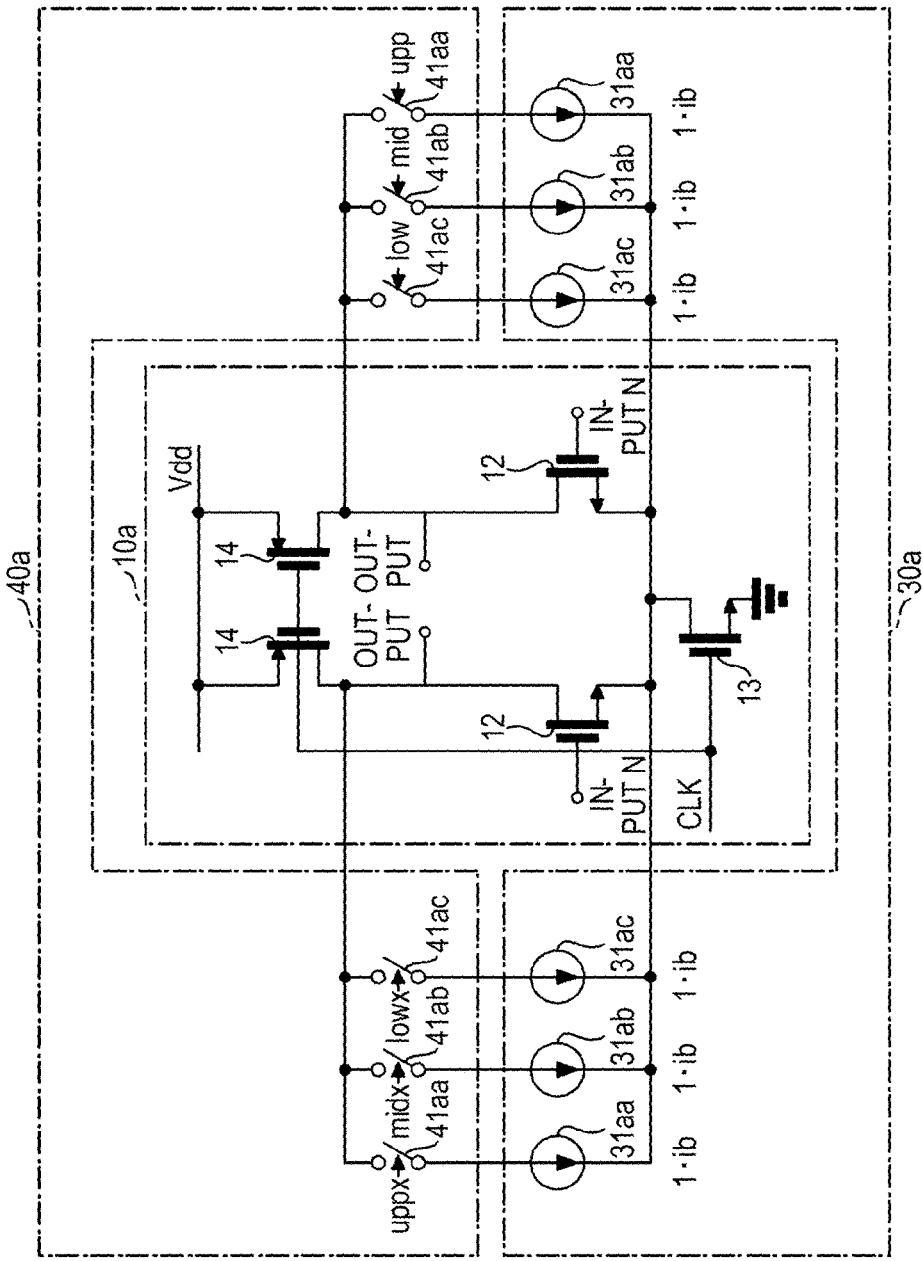
FIG. 3 is a diagram illustrating an example of the configuration of each of a comparator, a switch circuit, and a threshold setting circuit according to an embodiment.

FIG. 3 is a diagram illustrating an example of the configuration of each of a comparator, a switch circuit, and a threshold setting circuit according to the present embodiment. FIG. 3 illustrates an example of the configuration of the comparator 10a illustrated in FIG. 2 and an example of the configuration of the threshold setting circuit 30a and the switch circuit 40a included in the setting circuit 600 illustrated in FIG. 2. The threshold setting circuit 30a is connected in parallel to the input stage of the comparator 10a via the switch circuit 40a.

The connection relationship between the comparator 10b and the switch circuit 40b and the threshold setting circuit 30b and the respective configurations thereof are the same as those illustrated in FIG. 3. Therefore, illustration thereof will not be repeated. Similarly, the connection relationship between the comparator 10c and the switch circuit 40c and the threshold setting circuit 30c and the respective configurations thereof are the same as those illustrated in FIG. 3. Therefore, illustration of thereof will not be repeated.

The comparator 10a includes a pair of transistors 12 to which differential data signals P and N (in this case, PAM4 signals) are input, a transistor 13 to which a clock signal CLK is input, and a pair of transistors 14 to which the clock signal CLK is input. The comparator 10a has a differential input-differential output configuration. The transistor 13 is connected between the pair of transistors 12 and the ground. The pair of transistors 14 is connected between the pair of transistors 12 and a power supply potential Vdd. The differential output part of the comparator 10a is connected to the latch 20 a (see FIG. 2).

In FIG. 3, the switch circuit 40a is on/off-controlled by the latch output signals fed back from the latches 20a, 20b, and 20c illustrated in FIG. 2. The switch circuit 40a has three sets of pairs of transistors connected in parallel to the input stage of the comparator 10a. A pair of transistors 41aa, a pair of transistors 41ab, and a pair of transistors 41ac are illustrated in FIG. 3. The sizes of the three sets of pairs of transistors are all the same.

One of the pair of transistors 41aa is on/off-controlled by a latch output signal upp, which is output from the positive side output part of the latch 20a, and the other is on/off-controlled by a latch output signal uppx, which is output from the negative side output part of the latch 20a. The latch output signal uppx is an inversion (in terms of logic level) of the latch output signal upp.

One of the pair of transistors 41ab is on/off-controlled by a latch output signal mid, which is output from the positive side output part of the latch 20b, and the other is on/off-controlled by a latch output signal midx, which is output from the negative side output part of the latch 20b. The latch output signal midx is an inversion (in terms of logic level) of the latch output signal mid.

One of the pair of transistors 41ac is on/off-controlled by a latch output signal low, which is output from the positive side output part of the latch 20c, and the other is on/off-controlled by a latch output signal lowx, which is output from the negative side output part of the latch 20c. The latch output signal lowx is an inversion (in terms of logic level) of the latch output signal low.

The threshold setting circuit 30a is connected to the input stage of the comparator 10a via the switch circuit 40a, and sets the first decision threshold of the comparator 10a. The threshold setting circuit 30a has three sets of pairs of current sources each capable of supplying a current 1·ib. A pair of current sources 31aa, a pair of current sources 31ab, and a pair of current sources 31ac are illustrated In FIG. 3.

Figure 4:
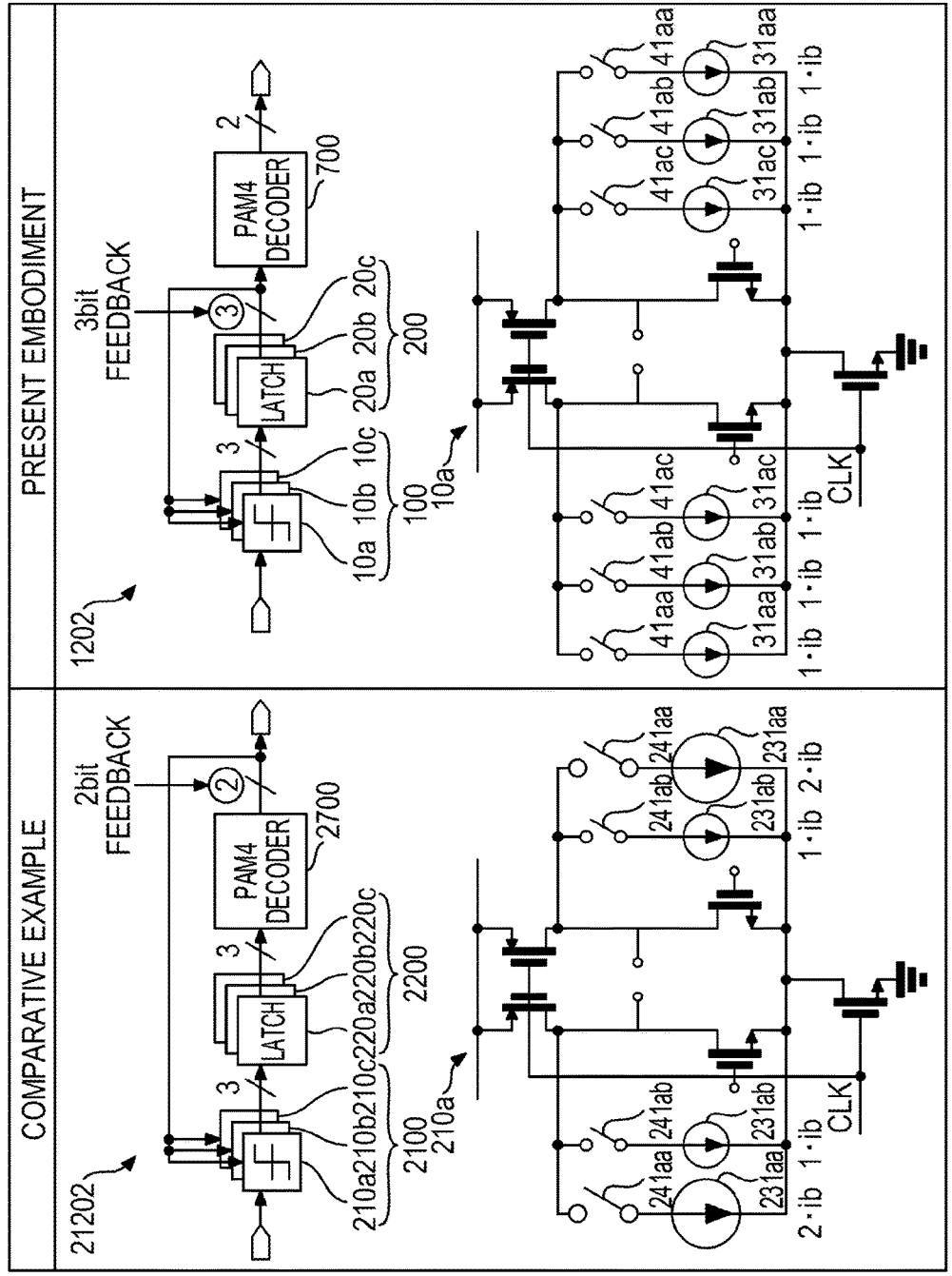
FIG. 4 is a diagram for explaining a difference between a comparative example and this embodiment.

FIG. 4 is a diagram for explaining a difference between a comparative example and the present embodiment.

A decision feedback equalizer 21202 according to the comparative example includes a comparison circuit 2100, a latch circuit 2200, and a decoder 2700. The comparison circuit 2100 has three comparators 210a, 210b, and 210c that compare the PAM4 signal with a plurality of (in this case, three) decision thresholds. The latch circuit 2200 has three latches 220a, 220b, and 220c for latching the comparison results of the three comparators 210a, 210b and 210c. The decoder 2700 converts a latch output signal representing the 3-bit comparison result output from the three latches 220a, 220b, and 220c into a 2-bit decoder output signal. The decision thresholds of the three comparators 210a, 210b, and 210c are set based on the 2-bit decoder output signal fed back from the decoder 2700.

As described above, in the comparative example, since the decoder 2700 is included in the feedback path (that is, since an output signal of the decoder 2700 is fed back), a delay time when a signal indicating the comparison result of the comparison circuit 2100 passes through the feedback path is increased.

Further, in the comparative example, since only two bits are fed back from the decoder 2700, in order to set the respective decision thresholds of the three comparators, it is necessary to prepare two sets of current sources for supplying currents having different current values and two sets of transistors of different sizes according to the current values of the current sources. A pair of current sources 231aa each capable of supplying a current 2·ib is driven by a pair of transistors 241aa to which the comparison result of the least significant bit (LSB) of the 2-bit comparison result is input. On the other hand, a pair of current sources 231ab each capable of supplying a current 1·ib is driven by a pair of transistors 241ab to which the comparison result of the most significant bit (MSB) of the 2-bit comparison result is input. Since the current source 231aa flows twice the current of the current source 231ab, the size of the pair of transistors 241aa is larger than the size of the pair of transistors 241ab. In this way, since the transistor size is different between the MSB feedback destination and the LSB feedback destination, the delay time of the feedback path driving a transistor of a larger size is longer than the delay time of the feedback path driving a transistor of a smaller size.

In contrast, in the present embodiment, the latch output signals indicating the comparison results of the three comparators are not input to the decoder 700, but are directly fed back to respective transistors 41aa, 41ab, and 41ac in each switch circuit connected in parallel to the input stage of each comparator. In this way, since the decoder 700 is not included in the path for feeding back the latch output signal, the delay time of the feedback path may be reduced. In addition, since the latch output signal fed back from the latch circuit 200 is a 3-bit signal, the transistors 41aa, 41ab, and 41ac may be reduced so as to have the same size. Therefore, it is possible to reduce the delay time of the feedback path, so that the delay time of each feedback path may be suppressed from varying between feedback paths. As a result, for example, it becomes easy for the reception device using the equalizer 1202 according to the present embodiment to handle a higher data rate.

First Embodiment

Figure 5:
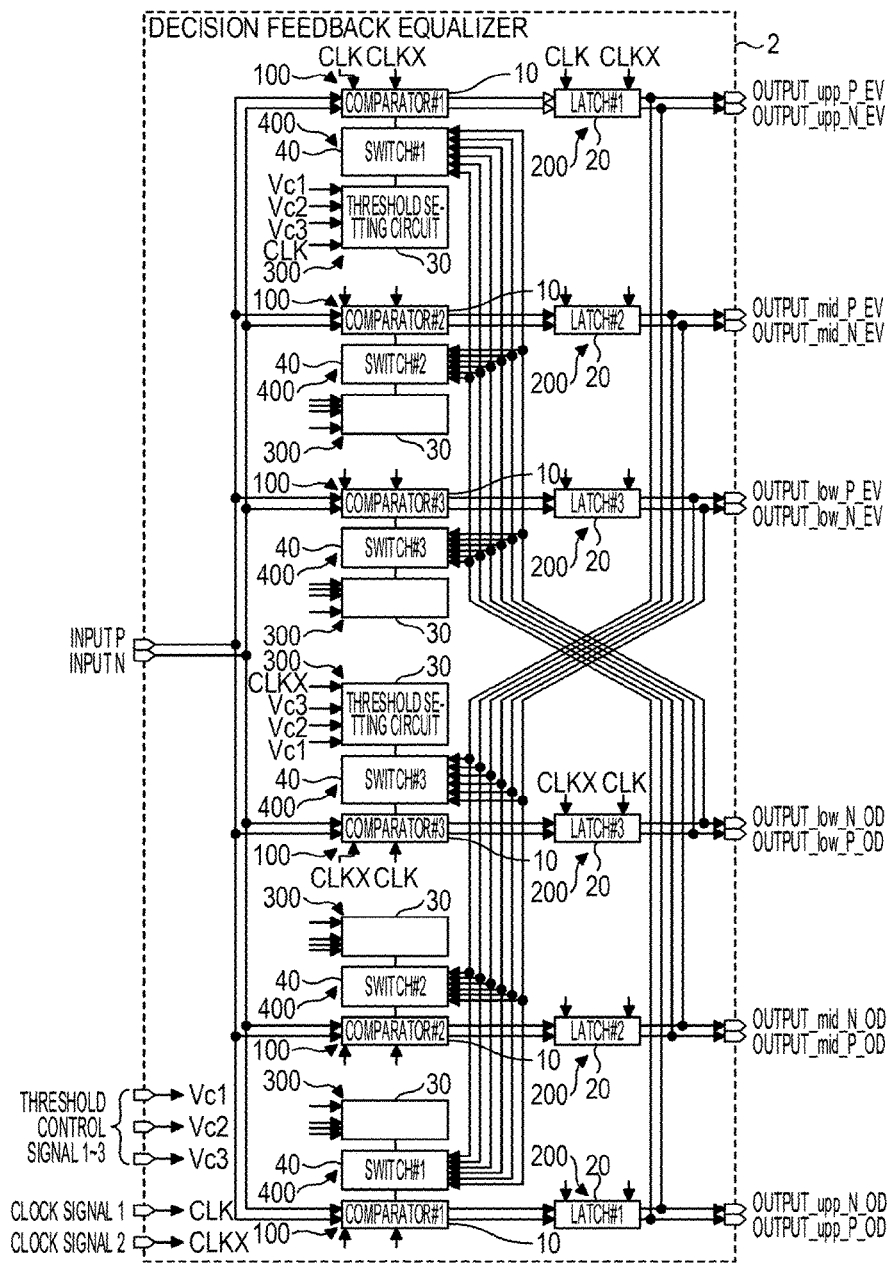
FIG. 5 is a diagram illustrating an example of the configuration of a decision feedback equalizer according to a first embodiment.

FIG. 5 is a diagram illustrating an example of the configuration of a decision feedback equalizer according to a first embodiment. An equalizer 2 illustrated in FIG. 5 is an example of a decision feedback equalizer that reduces the influence of ISI superimposed on differential data signals P and N input to the equalizer 2. The equalizer 2 includes a comparison circuit 100, a latch circuit 200, a setting circuit 300, and a switch circuit 400. Threshold control signals Vc1, Vc2, and Vc3, a clock signal CLK, and a clock signal CLKX are supplied from the outside of the equalizer 2.

For the purpose of simplification of explanation, the operation of each of comparators 10 in the comparison circuit 100 and the operation of each of latches 20 in the latch circuit 200 are defined as follows.

A comparator 10 has a differential input-differential output configuration in which an input signal and an output signal are differential signals.

In an evaluation period, in accordance with an input signal input to the comparator 10, the comparator 10 sets one of two output signals output from the comparator 10 to a high level and sets the other output signal to a low level. In a reset period, the comparator 10 sets both the two output signals output from the comparator 10 to the same value.

In an even comparator (upper comparator 10 in FIG. 5), it is assumed that a period during which the clock signal CLK input to the comparator 10 is at a low level is a reset period and a period during which the clock signal CLK is at a high level is an evaluation period. This is also applicable to an even latch (upper latch 20 in FIG. 5).

In an odd comparator (lower comparator 10 in FIG. 5), it is assumed that a period during which the clock signal CLKX input to the comparator 10 is at a low level is a reset period and a period during which the clock signal CLKX is at a high level is an evaluation period. This is also applicable to an odd latch (lower latch 20 in FIG. 5).

The clock signal CLK and the clock signal CLKX are mutually inverted. That is, when the clock signal CLK is at a low level, the clock signal CLKX is at a high level, but when the clock signal CLK is at a high level, the clock signal CLKX is at a low level.

The latch circuit 20 latches (retains) an output signal output during the evaluation period from the comparator 10 connected to the preceding stage of the latch circuit 20. That is, in the evaluation period, the latch circuit 20 latches the comparison result of the comparator 10 connected to the preceding stage of the latch circuit 20 and outputs a latch output signal corresponding to the latched comparison result. In the reset period of the comparator 10 connected to the preceding stage of the latch circuit 20, regardless of the output signal outputted from the comparator 10, the latch circuit 20 continues to output the latch output signal in accordance with the comparison result latched in the previous evaluation period. That is, in the reset period, the latch circuit 20 keeps on holding the comparison result of the comparator 10 fetched in the previous evaluation period.

These definitions are similarly applicable to other embodiments to be described later unless otherwise mentioned.

The equalizer 2 illustrated in FIG. 5 is a half rate DFE having a two-parallel time-interleave configuration. The equalizer 2 has a configuration for detecting each value of the PAM4 signal.

The equalizer 2 includes a comparison circuit 100, a latch circuit 200, a switch circuit 400, and a setting circuit 300. The comparison circuit 100 includes even comparators 10 and odd comparators 10 having the same configuration. The latch circuit 200 has even latches 20 and odd circuits 20 having the same configuration. The switch circuit 400 includes even switches 40 and odd switches 40 having the same configuration. The setting circuit 300 includes even threshold setting circuits 30 and odd threshold setting circuits 30 having the same configuration.

Hereinafter, the even comparators 10, the odd comparators 10, the even latches 20, and the odd latches 20 may be sometimes referred to as comparators 10e, comparators 100, latches 20e, and latches 20o, respectively. Similarly, the even switches 40, the odd switches 40, the even threshold setting circuits 30, and the odd threshold setting circuits 30 may be sometimes referred to as switches 40e, switches 40o, threshold setting circuits 30e, and threshold setting circuits 30o, respectively.

The comparison circuit 100 includes the comparators 10e operating in synchronization with the clock signals CLK and CLKX and the comparators 100 operating in synchronization with the clock signals CLKX and CLK. Each comparator 10e compares the magnitude relationship between the data signal P and the data signal N during the evaluation period when the clock signal CLK is at the high level, and continues to output the comparison result until the next evaluation period (the next period for which the clock signal CLK is at a high level) begins. Each comparator 100 compares the magnitude relationship between the data signal P and the data signal N during the evaluation period when the clock signal CLKX is at the high level, and continues to output the comparison result until the next evaluation period (the next period for which the clock signal CLKX is at a high level) begins.

The comparison circuit 100 includes six comparators 10 for comparing the data signals P and N, each of which is a PAM4 signal.

The latch circuit 200 latches the comparison result of the comparison circuit 100. The latch circuit 200 includes the latches 20e operating in synchronization with the clock signals CLK and CLKX and the latches 200 operating in synchronization with the clock signals CLKX and CLK. Each latch 20e latches the comparison result of the comparator 10e during the evaluation period when the clock signal CLK is at the high level, and continues to output a pair of latch output signals (output_*_P_EV and output_*_N_EV) according to the latched comparison result until the next evaluation period begins. Each latch 20o latches the comparison result of the comparator 10o during the evaluation period when the clock signal CLKX is at the high level, and continues to output a pair of latch output signals (output_*_P_OD and output_*_N_OD) according to the latched comparison result until the next evaluation period begins.

The latch circuit 200 includes six latches 20 for latching the comparison result of the corresponding one among the six comparators 10. Each of the six latches 20 latches the comparison result of one comparator 10 connected to the each latch among the six comparators 10.

The switch circuit 400 is on/off-controlled by an output signal of the latch circuit 200. The switch circuit 400 includes the switches 40e that are on/off-controlled by the latch output signal (output_*_P_OD and output_*_N_OD) and the switches 40o that are on/off-controlled by the latch output signal (output_*_P_EV and output_*_N_EV).

The switch circuit 400 includes six switches 40 which are on/off-controlled by output signals of the three corresponding latches 20 among the six latches 20. The three even switches 40e are on/off-controlled by six latch output signals (output_*_P_OD and output_*_N_OD) of the three odd latches 20o. The three odd switches 40o are on/off-controlled by six latch output signals (output_*_P_EV and output_*_N_EV) of the three even latches 20e.

The setting circuit 300 sets a decision threshold of the comparison circuit 100 according to the threshold control signals Vc1 to Vc3 supplied from the outside of the equalizer 2. Each of the threshold control signals Vc1 to Vc3 is an example of a control signal supplied from the outside. The setting circuit 300 includes the threshold setting circuits 30e operating in synchronization with the clock signal CLK for driving the comparators 10e and the threshold setting circuits 30o operating in synchronization with the clock signal CLKX for driving the comparators 10o. Each threshold setting circuit 30e sets the decision threshold of the comparator 10e according to the threshold control signals Vc1 to Vc3. Each threshold setting circuit 30o sets the decision threshold of the comparator 10o according to the threshold control signals Vc1 to Vc3.

The setting circuit 300 is connected in parallel to the input stage of the comparison circuit 100 via the switch circuit 400. The threshold setting circuit 30e is connected in parallel to the input stage of the comparator 10e via the switch 40e. The threshold setting circuit 30o is connected in parallel to the input stage of the comparator 100 via the switch 40o.

The setting circuit 300 includes six threshold setting circuits for setting the decision threshold of the corresponding one of the six comparators 10 according to the threshold control signals Vc1 to Vc3 supplied from the outside of the equalizer 3.

Figure 6:
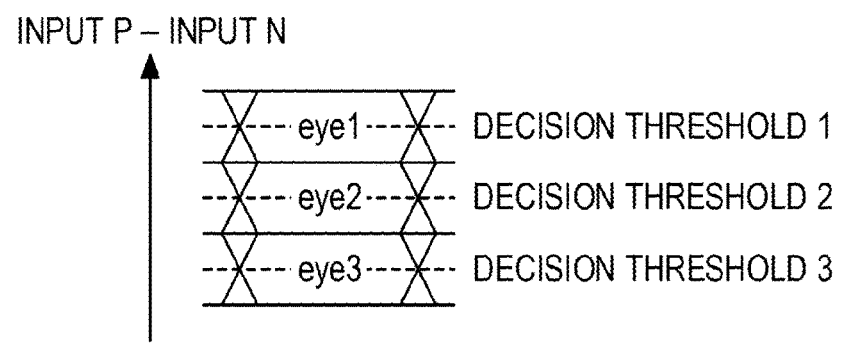
FIG. 6 is a diagram illustrating an example of each decision threshold according to the first embodiment.

FIG. 6 is a diagram illustrating an example of each decision threshold according to the first embodiment. As illustrated in FIG. 6, the decision threshold of each comparator 10 included in the equalizer 2 is set in the middle of each eye formed by a PAM4 signal input to each comparator 10. For example, the decision threshold 1 of each of the first even comparator 10 and the first odd comparator 10 is set to eye1. The decision threshold k of each of the k$^{th}$ even comparator 10 and the k$^{th}$ odd comparator 10 is set to eyek (k is a natural number from 1 to 3).

Figure 7:
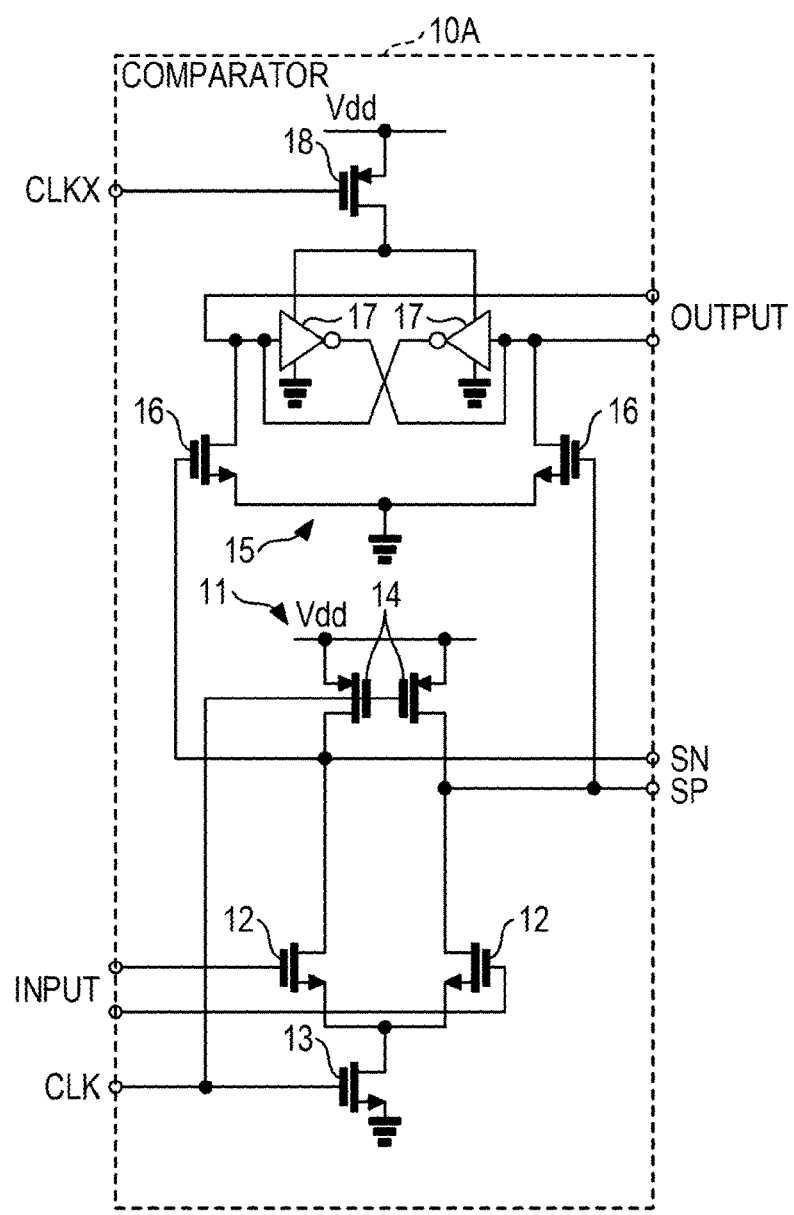
FIG. 7 is a diagram illustrating an example of the configuration of a comparator according to the first embodiment.

FIG. 7 is a diagram illustrating an example of the configuration of a comparator according to the first embodiment. A comparator 10A is an example of the comparator 10.

However, in the even comparator 10e, the inputs of the clock signal CLK and the clock signal CLKX are as illustrated in FIG. 7. On the other hand, in the odd comparator 10o, the clock signal CLK illustrated in FIG. 7 is replaced with the clock signal CLKX, and the clock signal CLKX illustrated in FIG. 7 is replaced with the clock signal CLK.

In the following description, unless otherwise mentioned, the even side configuration will be described and the description on the odd side configuration will be omitted by citing the description on the even side configuration. In the other embodiments to be described later, the description on the odd side configuration will also be omitted.

In FIG. 7, the comparator 10A is a double tail latch type comparator. The comparator 10A includes an input stage 11 and an output stage 15.

The input stage 11 includes a pair of transistors 12 to which the data signals P and N are input, a transistor 13 to which the clock signal CLK is input, and a pair of transistors 14 to which the clock signal CLK is input. The transistor 13 is connected between the pair of transistors 12 and the ground. The pair of transistors 14 is connected between the pair of transistors 12 and the power supply potential Vdd.

The output stage 15 latches and outputs the comparison result in the input stage 11. The output stage 15 includes a pair of transistors 16, a pair of inverters 17, and a transistor 18. The input part (specifically, gate) of the pair of transistors 16 is connected to each node between the pair of transistors 12 and the pair of transistors 14. The pair of transistors 16 is connected between a pair of output parts of the comparator 10A and the ground. The pair of output parts of the comparator 10A is connected to the pair of inverters 17 forming a latch. The transistor 18 to which the clock signal CLKX is input is connected between the pair of inverters 17 and the power supply potential Vdd. The pair of output parts of the comparator 10A is connected to the corresponding one latch circuit 20 (see FIG. 5).

Figure 8:
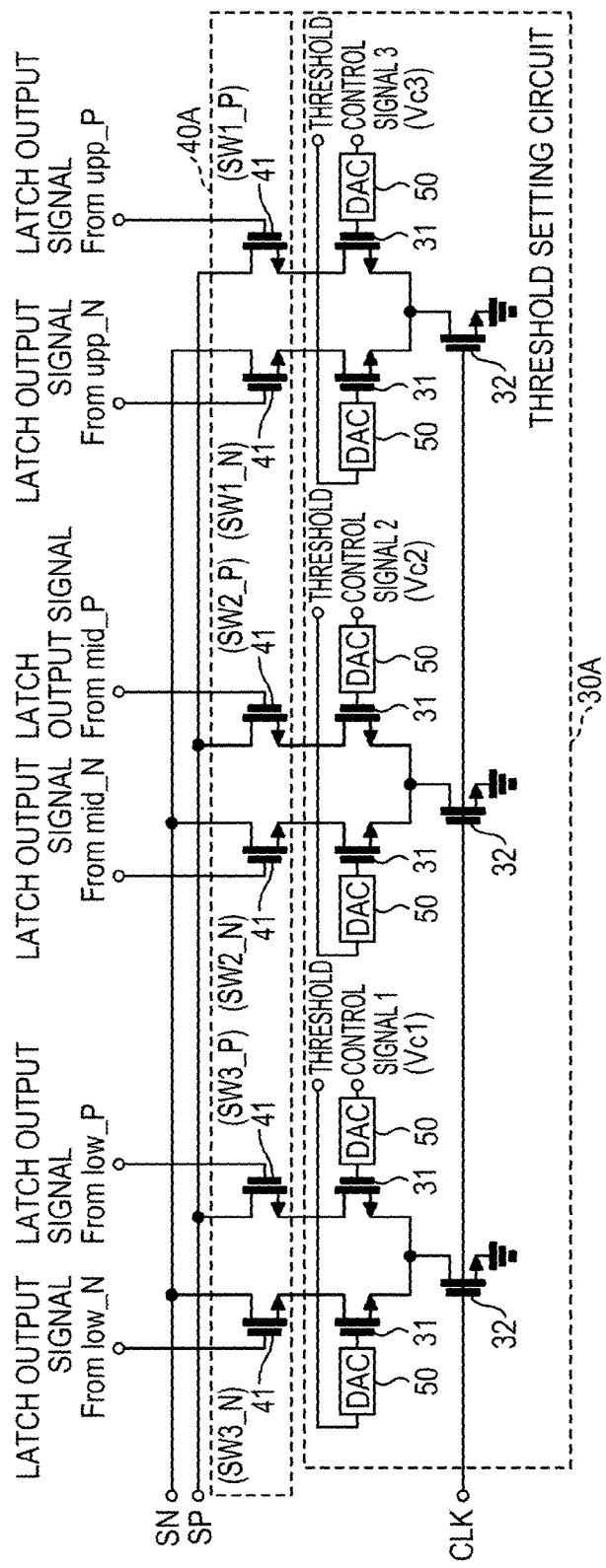
FIG. 8 is a diagram illustrating an example of the configuration of each of a switch circuit and a threshold setting circuit according to the first embodiment.

FIG. 8 is a diagram illustrating an example of the configuration of each of a switch circuit and a threshold setting circuit according to the first embodiment. A switch circuit 40A is an example of the switch circuit 40 and a threshold setting circuit 30A is an example of the threshold setting circuit 30.

However, in the even threshold setting circuit 30e, the input of the clock signal CLK is as illustrated in FIG. 8. On the other hand, in the odd threshold setting circuit 300, the clock signal CLK illustrated in FIG. 8 is replaced with the clock signal CLKX.

In FIG. 8, the switch circuit 40A includes three sets of pairs of transistors 41 (that is, six transistors 41) connected in parallel to the input stage 11 of the comparator 10A. One end of each transistor 41 to which the latch output signal (output_*_P_OD) is input is connected to a node SP between one transistor 14 and one transistor 12 (see FIGS. 7 and 8). One end of each transistor 41 to which the latch output signal (output_*_N_OD) is input is connected to a node SN between the other transistor 14 and the other transistor 12 (see FIGS. 7 and 8).

In FIG. 8, the threshold setting circuit 30A is connected in parallel to the input stage 11 of the comparator 10A via the switch circuit 40A. The threshold setting circuit 30A includes, for example, three transistors 32, three sets of pairs of threshold adjustment transistors 31 (six threshold adjustment transistors 31), and three sets of pairs of digital-to-analog converters (DACs) 50 (six DACs 50).

The clock signal CLK is input to each transistor 32. Each transistor 32 is connected between a pair of threshold adjustment transistors 31 and the ground.

The pair of threshold adjustment transistors 31 is connected in series to the switch circuit 40A and is connected in parallel to the input stage 11 of the comparator 10A via the switch circuit 40A. The pair of threshold adjustment transistors 31 is controlled via a pair of DACs 50 according to one of the threshold control signals Vc1 to Vc3. One threshold adjustment transistor 31 is connected in series to one transistor 41 and is controlled via one DAC 50 according to one of the threshold control signals Vc1 to Vc3. One threshold adjustment transistor 31 is connected to a node SP between one transistor 14 and one transistor 12 via one transistor 41. The other threshold adjustment transistor 31 is connected in series to the other transistor 41 and is controlled via the other DAC 50 according to one of the threshold control signals Vc1 to Vc3. The other threshold adjustment transistor 31 is connected to a node SN between the other transistor 14 and the other transistor 12 via the other transistor 41.

The threshold setting circuit 30A uses the DACs 50 that output a threshold control voltage which is changed linearly with respect to the digital threshold control signals Vc1 to Vc3. The threshold setting circuit 30A controls the gate of each transistor 31 connected in parallel to the input stage 11 by the threshold control voltage output from each DAC 50. Accordingly, since the DFE coefficient of the comparator 10A is changed linearly with respect to the digital threshold control signals Vc1 to Vc3, the decision threshold of the comparator 10A is able to be changed linearly. Therefore, since ISI is able to be further removed, the removal performance of ISI is able to be improved.

The pair of DACs 50 is an example of a digital-to-analog converter that controls the pair of threshold adjustment transistors 31 according to one of the threshold control signals Vc1 to Vc3. The pair of DACs 50 converts one of the digital threshold control signals Vc1 to Vc3 into an analog threshold control voltage and controls the gates of the pair of threshold adjustment transistors 31 by the analog threshold control voltage. The analog threshold control voltage is an example of a control voltage which is changed linearly with respect to a control signal.

In FIGS. 7 and 8, each of the transistors 12, 13, 16, 31, 32, and 41 is, for example, an N-channel MOSFET (Metal Oxide Semiconductor Field Effect Transistor). In addition, each of the transistors 14 and 18 is, for example, a P-channel MOSFET.

Figure 9:
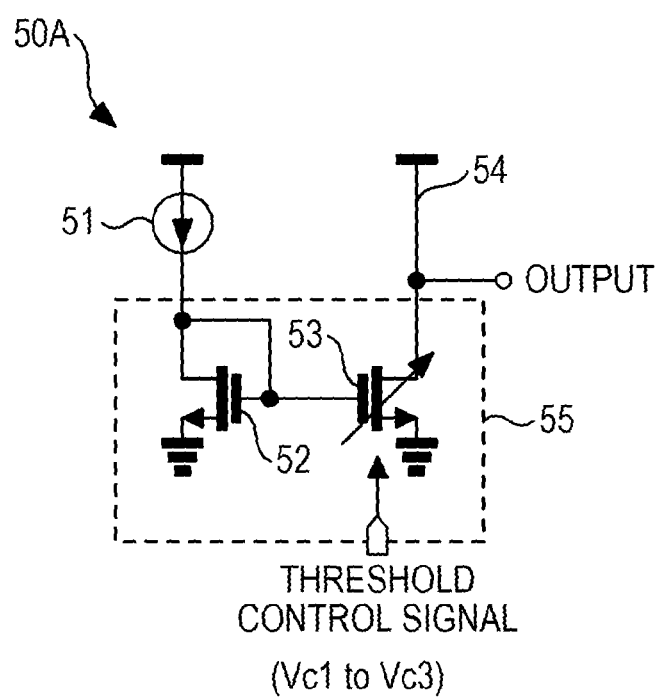
FIG. 9 is a diagram illustrating an example of the configuration of a DAC.

FIG. 9 is a diagram illustrating an example of the configuration of a DAC. A DAC 50A is an example of the DAC 50. The DAC 50A includes a constant current source 51, a current mirror circuit 55, and a load resistor 54. The current mirror circuit 55 changes an output current of the copy destination in proportion to a reference source current (a constant current generated by the constant current source 51) according to one of the threshold control signal Vc1 to Vc3. The current mirror circuit 55 outputs a threshold control voltage which is changed linearly with respect to the threshold control signals Vc1 to Vc3.

The current mirror circuit 55 includes, for example, at least one transistor 52 on the input side and a plurality of transistors 53 on the output side. When the number of transistors 53 turned on is varied linearly according to one of the digital threshold control signals Vc1 to Vc3, the current mirror circuit 55 outputs a threshold control voltage which is changed linearly with respect to one of the digital threshold control signals Vc1 to Vc3.

Next, the operation of the equalizer 2 according to the first embodiment will be described.

Figure 10:
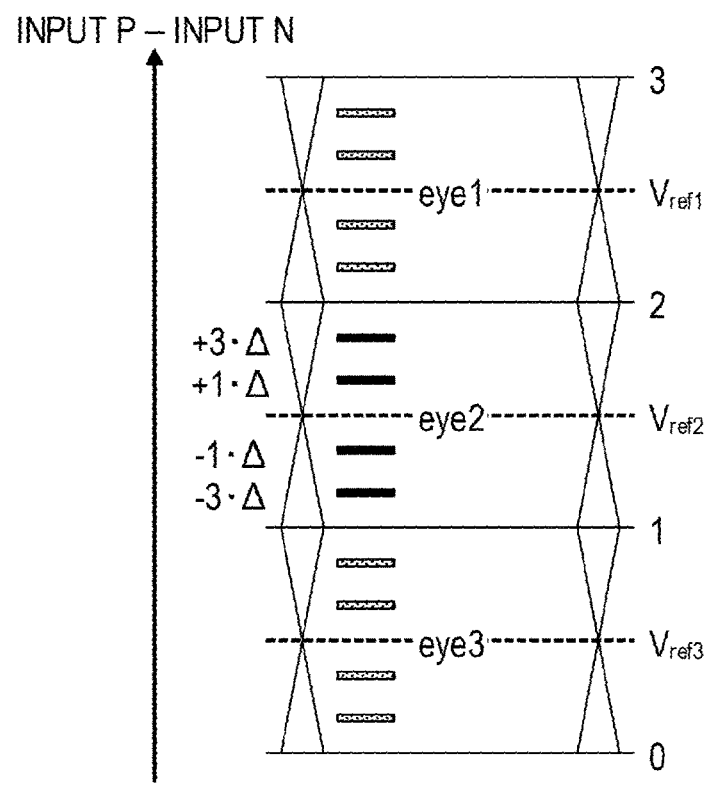
FIG. 10 is a diagram for explaining a method of setting each decision threshold according to the first embodiment.

The amplitude of a differential signal input to the comparator 10A is defined as "input P−input N" (see FIG. 10). The relationship between the amplitude level of a data signal input to the comparator 10A and the output of each latch circuit is as illustrated in the truth table illustrated in FIG. 11. In addition, since all the switches to which the decision result of a comparator outputted from a latch circuit is fed back are N-channel transistors, the on/off state of each transistor is also set as illustrated in the truth table of FIG. 11. The amounts of currents flowing by the threshold adjustment transistors 31 connected respectively to the six transistors 41 (SW1_P, SW1_N, SW2_P, SW2_N, SW3_P and SW3_N) illustrated in FIG. 8 in the evaluation period of the comparator 10A are all set to be the same. Therefore, the absolute values of variation amounts of the decision thresholds of the comparator 10A set by respective threshold adjustment transistors 31 are all the same.

As an example, an operation when the amplitude level of the data signal input to the comparator 10A is "2" will be described with reference to FIG. 11.

When the amplitude level of the input data signal is "2", the positive side terminal of a latch circuit #1 (see FIG. 5) to which the decision result of a comparator #1 (see FIG. 5) is input outputs "0" and the negative side output terminal of the latch circuit #1 outputs "1". In FIG. 11, the output level of the positive side terminal of the latch circuit is illustrated but the output of the negative side terminal of the latch circuit is not illustrated. Each of the positive side terminals of a latch circuit #2 and a latch circuit #3 to which the decision results of a comparator #2 and a comparator #3 are input outputs "1" and each of the negative side output terminals thereof output "0". Therefore, the switch SW1_P to which the positive side output terminal of the latch circuit #1 is connected is turned off and the switch SW1_N to which the negative side terminal of the latch circuit #1 is connected is turned on (see FIG. 11). Similarly, the switches SW2_P and SW3_P are turned on and the switches SW2_N and SW3_N are turned off (see FIG. 11).

Here, the amounts of currents flowing by the threshold adjustment transistors connected respectively to the six transistors 41 (SW1_P, SW1_N, SW2_P, SW2_N, SW3_P and SW3_N) illustrated in FIG. 8 in the evaluation period of the comparator are all the same. Therefore, in the next evaluation period, a decision threshold of "Vref+1·Δ" is set for each comparator (see FIG. 11). Therefore, according to this configuration, the decision threshold of the comparator in the next evaluation period is able to be reliably set to a desired value.

Further, in this configuration, a latch output signal representing the decision result of the comparator is directly fed back from the latch circuit 200 to the switch circuit 400 without passing through the PAM4 decoder 700. Furthermore, since the sizes of the transistors included in the switch circuit 400 are the same, the propagation delays in the transistors are the same. Therefore, according to this configuration, the delay time of a decision result feedback path in the DFE is able to be reduced. As a result, a data receiver using the DFE is able to handle a higher data rate.

Figure 12:
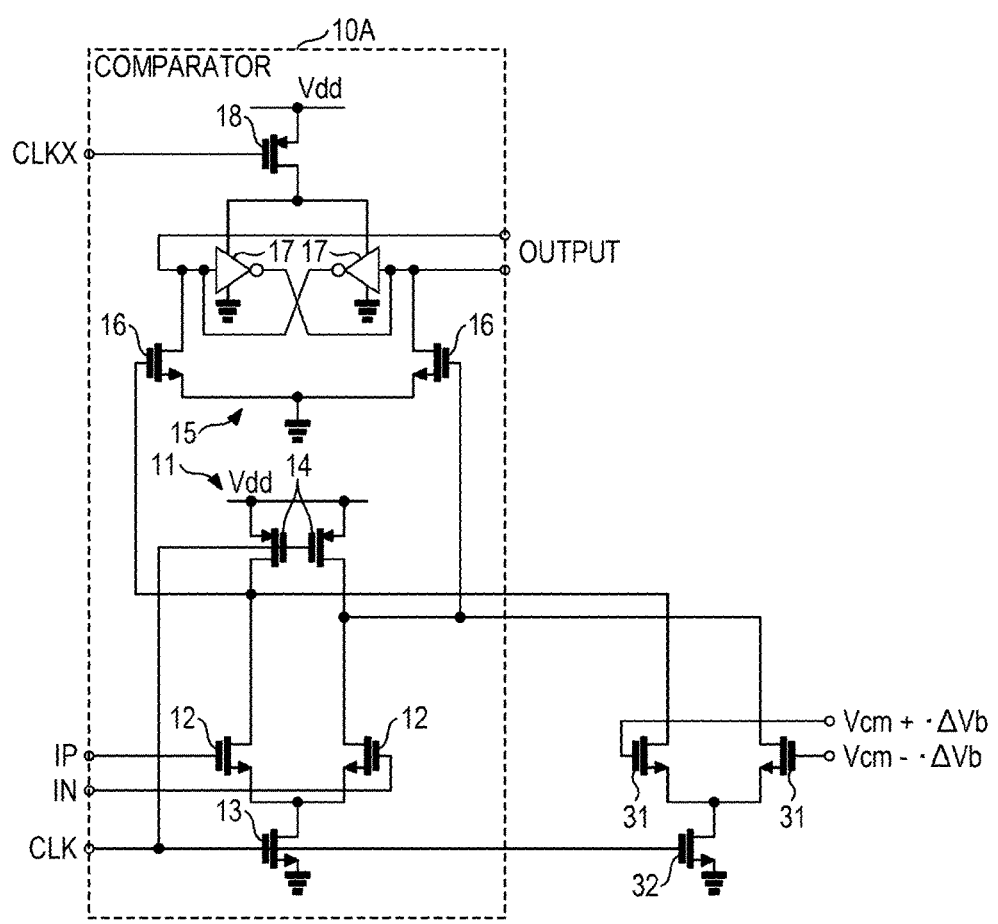
FIG. 12 is a circuit diagram illustrating an example of a configuration in which a transistor is connected in parallel to an input stage of a comparator.
Figure 13:
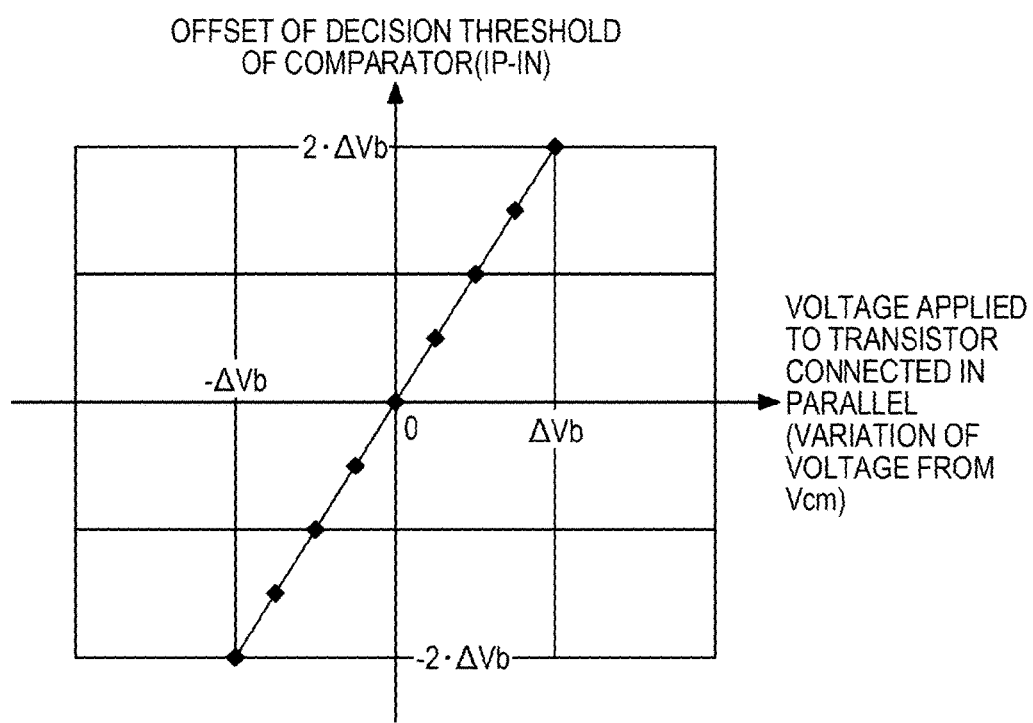
FIG. 13 is a graph illustrating an example of the relationship between a voltage value applied to a gate of the transistor connected in parallel and an offset of a decision threshold voltage of the comparator.

FIG. 12 is a circuit diagram illustrating an example of a configuration in which a pair of transistors 31 is connected in parallel to the input stage 11 of the comparator 10A. FIG. 13 is a graph illustrating an example of the relationship between a voltage value applied to the gates of the pair of transistors 31 connected to the input stage 11 and an offset (IP−IN) of the decision threshold of the comparator 10A.

Vcm represents the operating point of a differential signal input to the comparator 10A. As illustrated in FIGS. 12 and 13, in the configuration in which the pair of transistors 31 is connected in parallel to the input stage 11 of the comparator 10A, the offset (IP−IN) of the decision threshold of the comparator 10A is proportional to a voltage value ΔVb applied to the gates of the pair of transistors 31.

Therefore, as illustrated in FIGS. 7 and 8, in the configuration in which the threshold setting circuit 30A is connected in parallel to the input stage 11 of the comparator 10A, the decision threshold of the comparator 10A able to be changed linearly according to the threshold control signals Vc1 to Vc3. For example, the threshold setting circuit 30A uses the DACs 50 that output a threshold control voltage which is changed linearly with respect to the digital threshold control signals Vc1 to Vc3. The threshold setting circuit 30A controls the gates of the respective transistors 31 connected in parallel to the input stage 11 by the threshold control voltage output from each DAC 50. Accordingly, since the DFE coefficient of the comparator 10A is changed linearly with respect to the digital threshold control signals Vc1 to Vc3, the decision threshold of the comparator 10A is able to be changed linearly.

FIG. 14 is a graph illustrating an example of a change between an external control signal and a DFE coefficient. In FIG. 14, a "conventional example" illustrates one example for Non-Patent Document 3 mentioned above and "present embodiment" illustrates an example for the first embodiment.

In the "conventional example", the DFE coefficient is changed nonlinearly with respect to an external digital control signal (the number of transistors turned on). Therefore, it is difficult to set the DFE coefficient to the same value as ISI when the resolution of the DFE coefficient is relatively large (when the digital control signal is relatively small). Therefore, the removal performance of ISI by DFE may be reduced.

On the other hand, in the "present embodiment", the linearity of the DFE coefficient with respect to the external digital control signal (the output voltage of the DAC 50) is improved over the "conventional example". In this way, the linearity of the DFE coefficient actually set is improved with respect to the external control signal which determines the DFE coefficient. As a result, there is no place where the resolution of the DFE coefficient is large. Therefore, the ISI is able to be further removed, thereby improving the removal performance of ISI.

Second Embodiment

Figure 15:
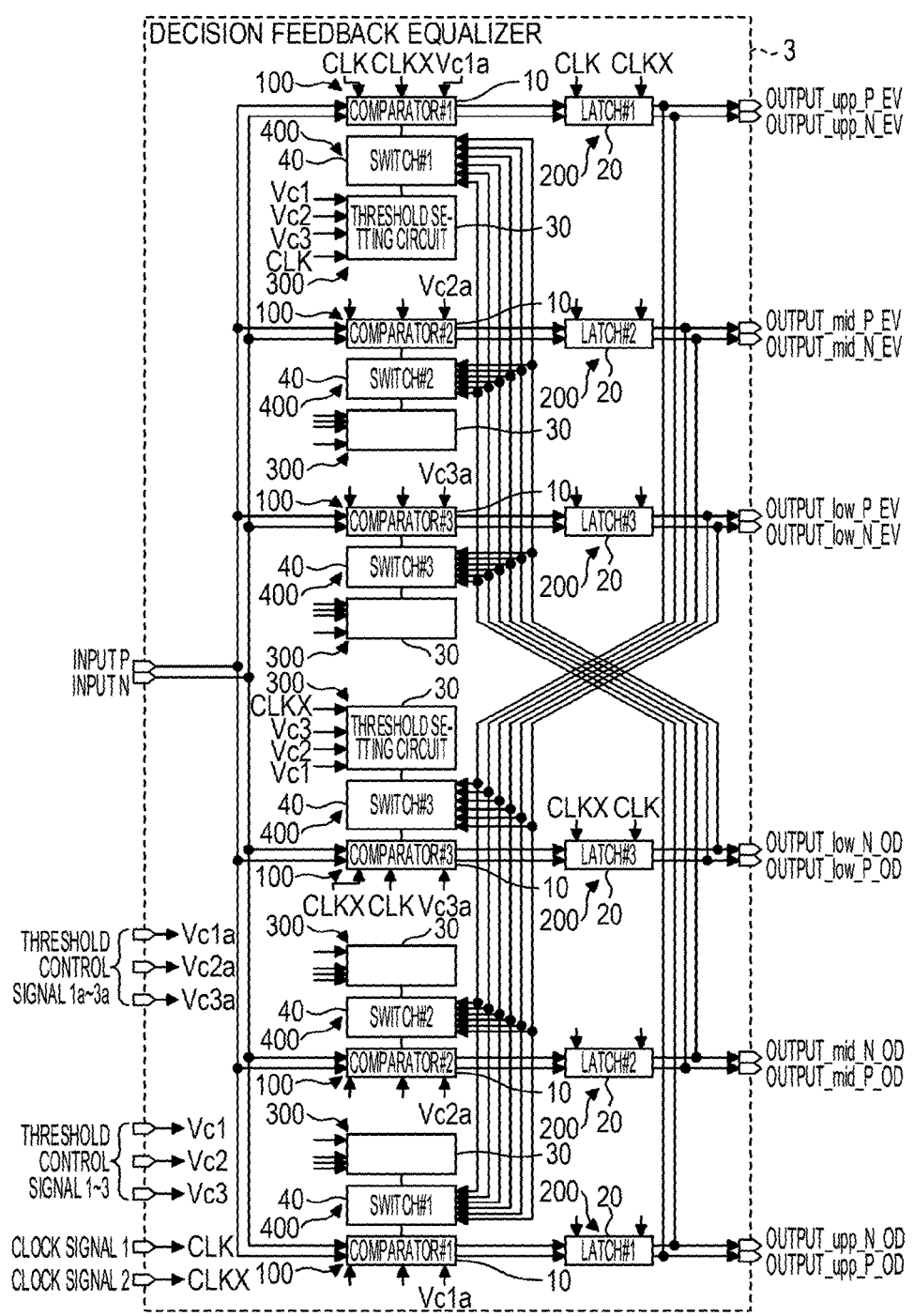
FIG. 15 is a diagram illustrating an example of the configuration of a decision feedback equalizer according to a second embodiment.

FIG. 15 is a diagram illustrating an example of the configuration of a decision feedback equalizer according to a second embodiment. Of the configurations and effects of the second embodiment, descriptions of configurations and effects similar to those of the above-described embodiments will be omitted by citing the above description.

An equalizer 3 illustrated in FIG. 15 is an example of a decision feedback equalizer that reduces the influence of ISI superimposed on differential data signals P and N input to the equalizer 3. Threshold control signals Vc1a to Vc3a, threshold control signals Vc1 to Vc3, a clock signal CLK, and a clock signal CLKX are supplied from the outside of the equalizer 3.

Figure 16:
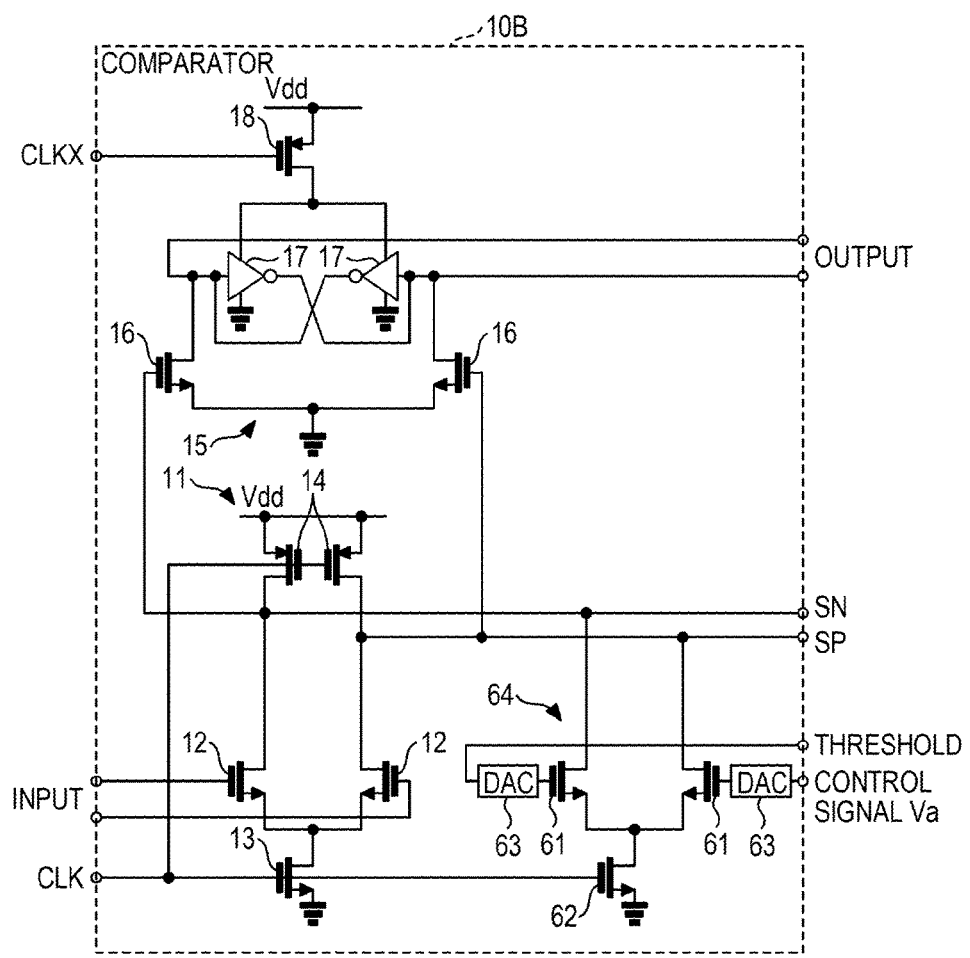
FIG. 16 is a diagram illustrating an example of the configuration of a comparator according to the second embodiment.

FIG. 16 is a diagram illustrating an example of the configuration of a comparator according to the second embodiment. A comparator 10B is an example of the comparator 10. A threshold control signal Va is one of the threshold control signals Vc1a to Vc3a.

However, in the even comparator 10e, the inputs of the clock signal CLK and the clock signal CLKX are as illustrated in FIG. 16. On the other hand, in the odd comparator 10o, the clock signal CLK illustrated in FIG. 16 is replaced with the clock signal CLKX and the clock signal CLKX illustrated in FIG. 16 is replaced with the clock signal CLK.

A comparator 10B is different from the comparator 10A (see FIG. 7) in that the former includes an offset adjustment circuit 64 connected in parallel to the input stage 11. The offset adjustment circuit 64 adjusts an offset of the decision threshold of the comparator 10B. The offset adjustment circuit 64 includes, for example, a transistor 62, a pair of threshold correction transistors 61, and a pair of digital-to-analog converters (DACs) 63.

The clock signal CLK is input to the transistor 62. The transistor 62 is connected between the pair of threshold correction transistors 61 and the ground.

The pair of threshold correction transistors 61 is connected in parallel to the input stage 11 of the comparator 10B. The pair of threshold correction transistors 61 is controlled via the pair of DACs 63 according to the threshold control signal Va. One threshold correction transistor 61 is controlled via one DAC 63 according to the threshold control signal Va. One threshold correction transistor 61 is connected to a node SP between one transistor 14 and one transistor 12. The other threshold correction transistor 61 is controlled via the other DAC 63 according to the threshold control signal Va. The other threshold correction transistor 61 is connected to a node SN between the other transistor 14 and the other transistor 12.

The pair of DACs 63 is an example of a digital-to-analog converter that controls the pair of threshold correction transistors 61 according to the threshold control signal Va. The pair of DACs 63 converts the digital threshold control signal Va into an analog threshold correction control voltage and controls the gates of the pair of threshold correction transistors 61 by the analog threshold correction control voltage.

In FIG. 16, each of the transistors 61 and 62 is, for example, an N-channel MOSFET.

The offset adjustment circuit 64 uses the DACs 63 that output a threshold correction control voltage which is changed linearly with respect to the digital threshold control signal Va. The offset adjustment circuit 64 controls the gate of each transistor 61 connected in parallel to the input stage 11 by the threshold correction control voltage output from each DAC 60. Accordingly, it is possible to make a correction to reduce an offset due to individual variations in manufacturing of the decision threshold of the comparator 10B.

Third Embodiment

Figure 17:
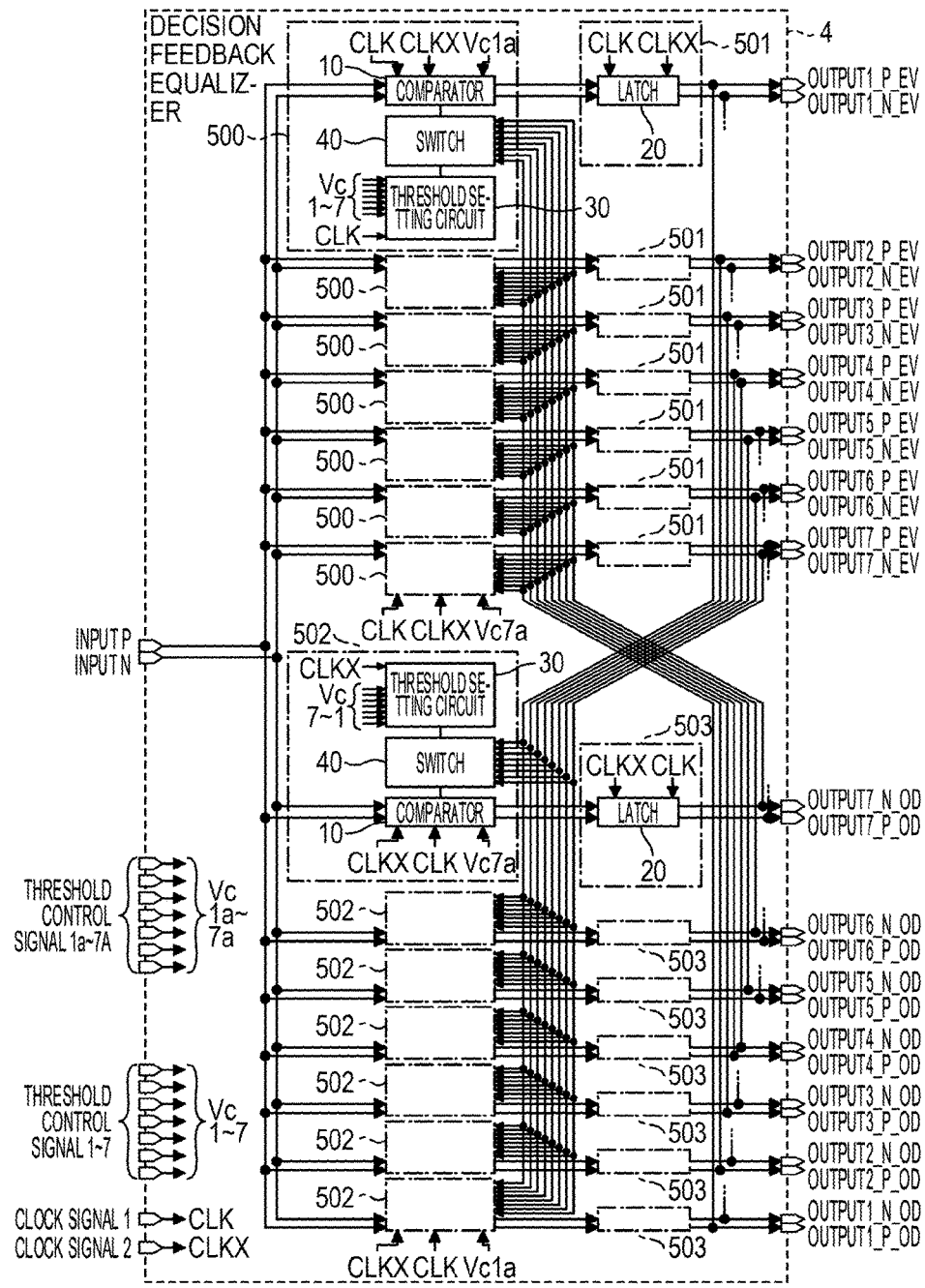
FIG. 17 is a diagram illustrating an example of the configuration of a decision feedback equalizer according to a third embodiment.

FIG. 17 is a diagram illustrating an example of the configuration of a decision feedback equalizer according to a third embodiment. Of the configurations and effects of the third embodiment, descriptions of configurations and effects similar to those of the above-described embodiments will be omitted by citing the above description.

An equalizer 4 illustrated in FIG. 17 is an example of a decision feedback equalizer that reduces the influence of ISI superimposed on differential data signals P and N input to the equalizer 4. Threshold control signals Vc1a to Vc7a, threshold control signals Vc1 to Vc7, a clock signal CLK, and a clock signal CLKX are supplied from the outside of the equalizer 4.

The equalizer 4 has a configuration for detecting each value of an 8-value pulse amplitude modulation signal. Hereinafter, the 8-value pulse amplitude modulation signal may be referred to as a "PAM8 signal". Similarly to that described above, the equalizer 4 also includes a comparison circuit 100, a latch circuit 200, a switch circuit 400, and a setting circuit 300. Regarding circuits 500 to 503, the circuits denoted by the same reference numerals have the same configuration.

The comparison circuit 100 includes 14 comparators 10 for comparing the data signals P and N. Each of the data signals P and N is a PAM8 signal.

The latch circuit 200 includes 14 latches 20 for latching the comparison result of the corresponding one of the 14 comparators 10. Each of the six latches 20 latches the comparison result of one comparator 10 connected to the each latch among the six comparators 10.

The switch circuit 400 includes 14 switches that are on/off-controlled by the output signals of the corresponding seven latches 20 among the 14 latches 20. The seven even switches 40e are on/off-controlled by eight latch output signals (output 1_P_OD, output 2_P_OD, output 3_P_OD, output 4_P_OD, output 4_N_OD, output 5_N_OD, output 6_N_OD, and output 7_N_OD) of the seven odd latches 200. The seven odd switches 40o on/off-controlled by eight latch output signals (output 1_P_EV, output 2_P_EV, output 3_P_EV, output 4_P_EV, output 4_N_EV, output 5_N_EV, output 6_N_EV, and output 7_N_EV) of the seven even latches 20e.

The setting circuit 300 includes 14 threshold setting circuits for setting the decision threshold of the corresponding one of the 14 comparators 10 according to the threshold control signals Vc1 to Vc7 supplied from the outside of the equalizer 4. Each of the threshold control signals Vc1 to Vc7 is an example of a control signal.

Figure 18:
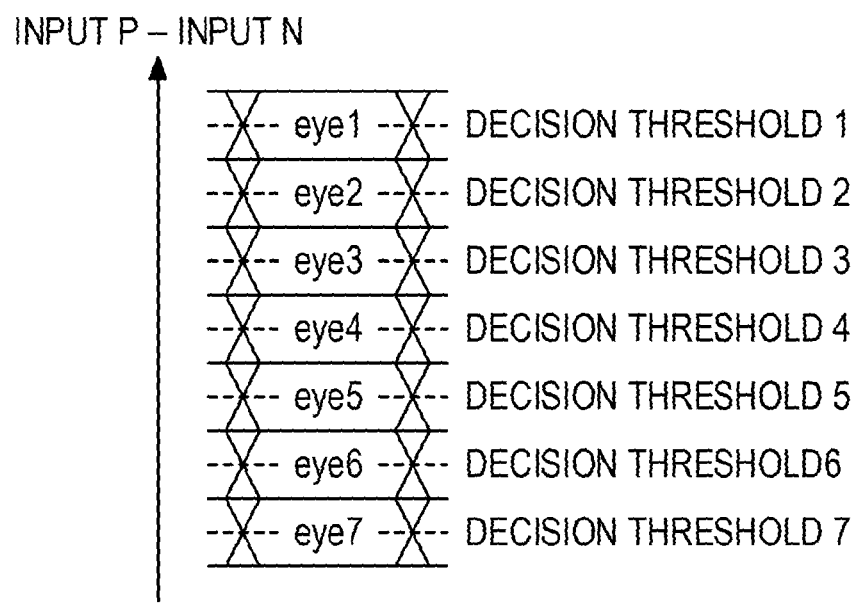
FIG. 18 is a diagram illustrating an example of each decision threshold according to the third embodiment.

FIG. 18 is a diagram illustrating an example of each decision threshold according to the third embodiment. As illustrated in FIG. 18, the decision threshold of each comparator 10 included in the equalizer 4 is set in the middle of each eye formed by a PAM8 signal input to each comparator 10. For example, the decision threshold 1 of each of the first even comparator 10 and the first odd comparator 10 is set to eye1. The decision threshold k of each of the $k^{th}$ even comparator 10 and the $k^{th}$ odd comparator 10 is set to eyek (k is a natural number from 1 to 7).

Figure 19:
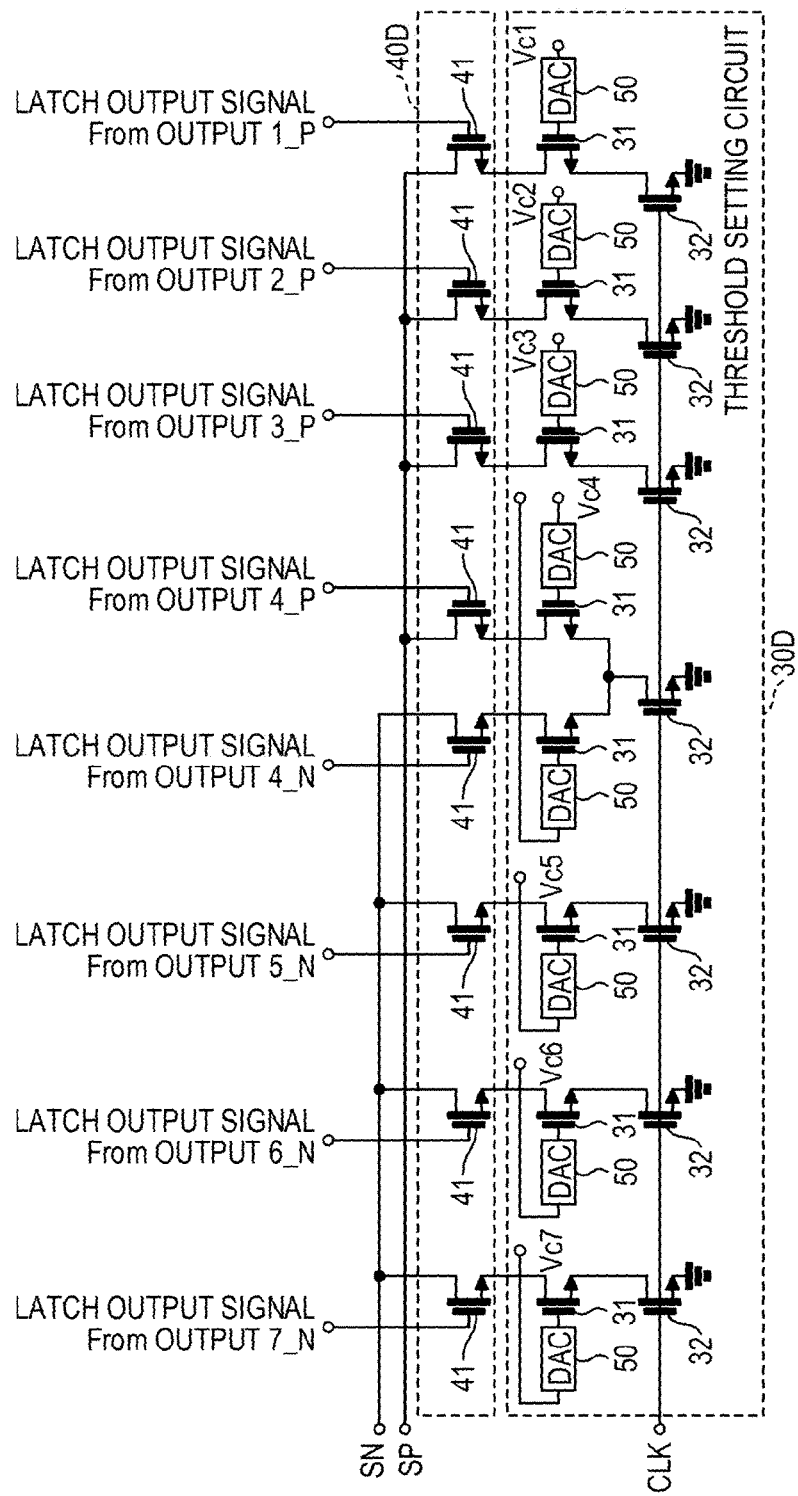
FIG. 19 is a diagram illustrating an example of the configuration of each of a switch circuit and a threshold setting circuit according to the third embodiment.

FIG. 19 is a diagram illustrating an example of the configuration of each of a switch circuit and a threshold setting circuit according to the third embodiment. A switch circuit 40D is an example of the switch circuit 40 and a threshold setting circuit 30D is an example of the threshold setting circuit 30. The comparator 10 according to the third embodiment is, for example, the comparator 10A or the comparator 10B described above.

However, in the even comparator 10e, the inputs of the clock signal CLK and the clock signal CLKX are as illustrated in FIG. 7 or 16. On the other hand, in the odd comparator 10o, the clock signal CLK illustrated in FIG. 7 or 16 is replaced with the clock signal CLKX and the clock signal CLKX illustrated in FIG. 7 or 16 is replaced with the clock signal CLK. In the even threshold setting circuit 30e, the input of the clock signal CLK is as illustrated in FIG. 19. On the other hand, in the odd threshold setting circuit 30o, the clock signal CLK illustrated in FIG. 19 is replaced with the clock signal CLKX.

In FIG. 19, the switch circuit 40D includes eight transistors 41 connected in parallel to the input stage 11 of the comparator 10. The threshold setting circuit 30D includes seven transistors 32, eight threshold adjustment transistors 31, and eight DACs 50.

The threshold setting circuit 30D uses the DACs 50 that output a threshold control voltage which is changed linearly with respect to the digital threshold control signals Vc1 to Vc7. The threshold setting circuit 30D controls the gate of each transistor 31 connected in parallel to the input stage 11 by the threshold control voltage output from each DAC 50. Accordingly, since the DFE coefficient of the comparator 10 is changed linearly with respect to the digital threshold control signals Vc1 to Vc7, the decision threshold of the comparator 10 is able to be changed linearly. Therefore, since ISI is able to be further removed, the removal performance of ISI is able to be improved.

Fourth Embodiment

Figure 20:
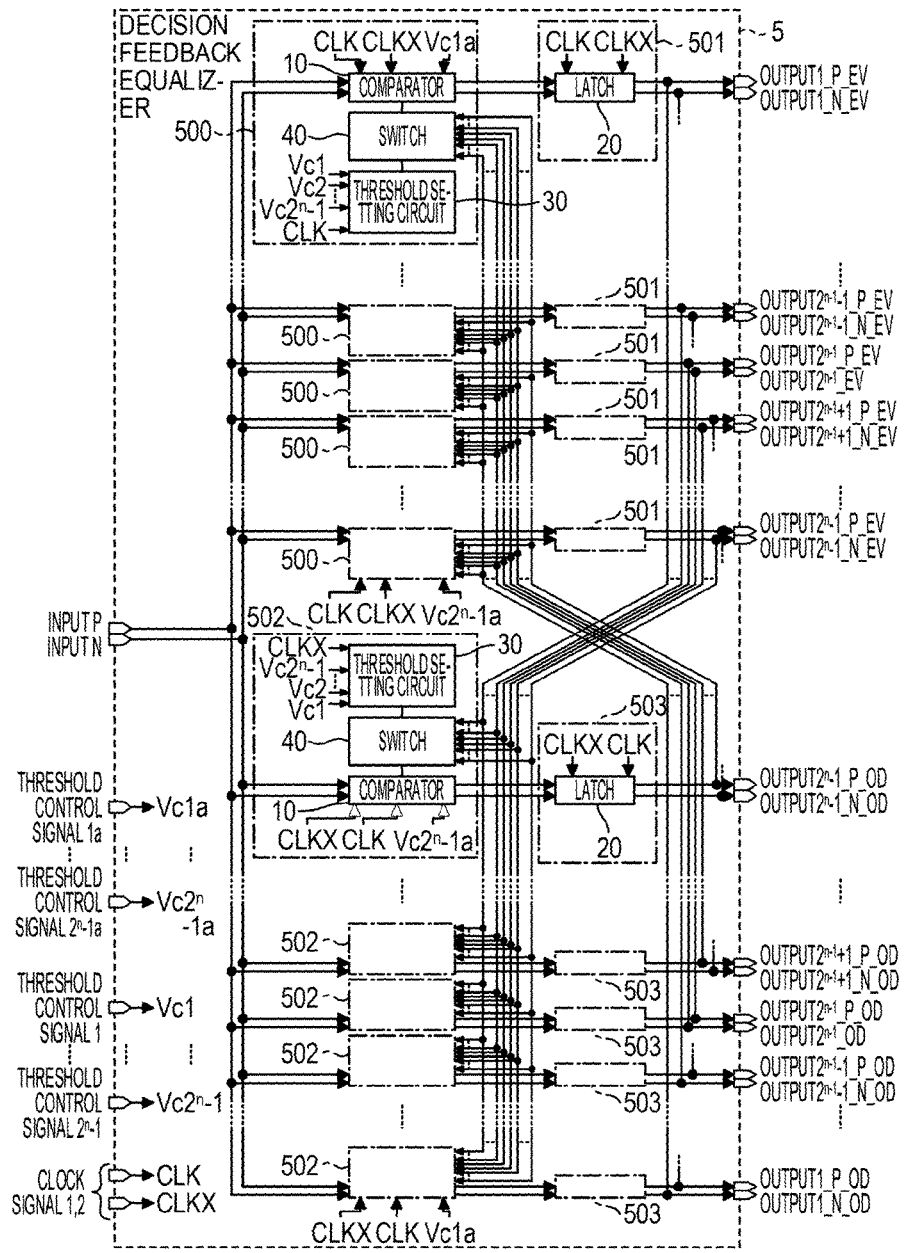
FIG. 20 is a diagram illustrating an example of the configuration of a decision feedback equalizer according to a fourth embodiment.

FIG. 20 is a diagram illustrating an example of the configuration of a decision feedback equalizer according to a fourth embodiment. Of the configurations and effects of the fourth embodiment, descriptions of configurations and effects similar to those of the above-described embodiments will be omitted by citing the above description.

The fourth embodiment is a generalization of the second embodiment and the third embodiment. The equalizer 5 illustrated in FIG. 20 has a configuration for detecting each value of a $2^n$-value (n is an integer of 2 or more) pulse amplitude modulation signal. Hereinafter, the $2^n$-value pulse amplitude modulation signal may be referred to as a "PAM$2^n$" signal".

The comparison circuit 100 includes $2\times(2^n-1)$ comparators 10 for comparing the PAM$2^n$ signals. The latch circuit 200 includes $2\times(2^n-1)$ latches 20 for latching the comparison results of the $2\times(2^n-1)$ comparators 10. The switch circuit 400 includes $2\times(2^n-1)$ switches 40 that are on/off-controlled by output signals of the $2\times(2^n-1)$ latches 20. The setting circuit 300 includes $2\times(2^n-1)$ threshold setting circuits for setting the decision threshold of the $2\times(2^n-1)$ comparators 10 according to threshold control signals Vc1 to Vc$2^n-1$ supplied from the outside of the equalizer 5. Each of the threshold control signals Vc1 to Vc$2^n-1$ is an example of a control signal.

Figure 21:
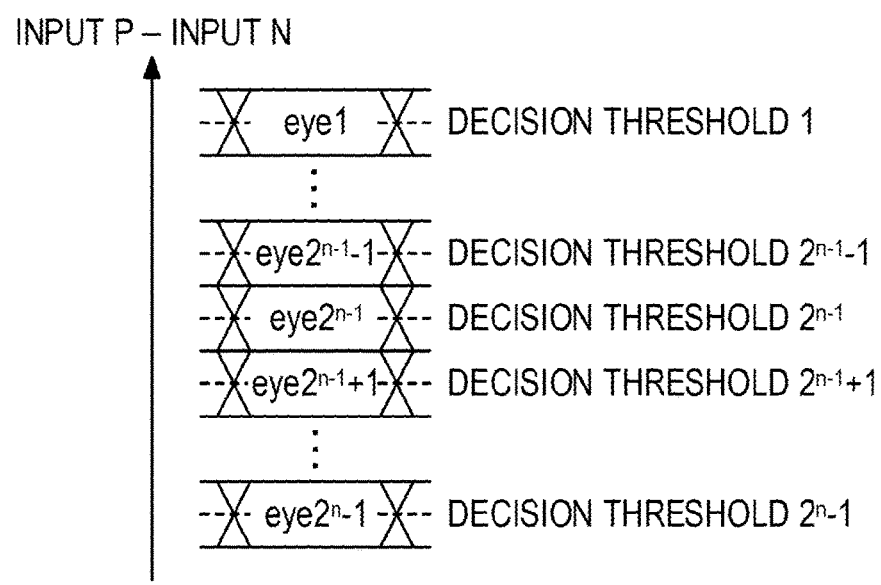
FIG. 21 is a diagram illustrating an example of each decision threshold according to the fourth embodiment.

FIG. 21 is a diagram illustrating an example of each decision threshold according to the fourth embodiment. As illustrated in FIG. 21, the decision threshold of each comparator 10 included in the equalizer 5 is set in the middle of each eye formed by a PAM$2^n$ signal input to each comparator 10. For example, the decision threshold 1 of each of the first even comparator 10 and the first odd comparator 10 is set to eye1. The decision threshold k of each of the $k^{th}$ even comparator 10 and the $k^{th}$ odd comparator 10 is set to eyek (k is a natural number from 1 to $2^n-1$).

Figure 22:
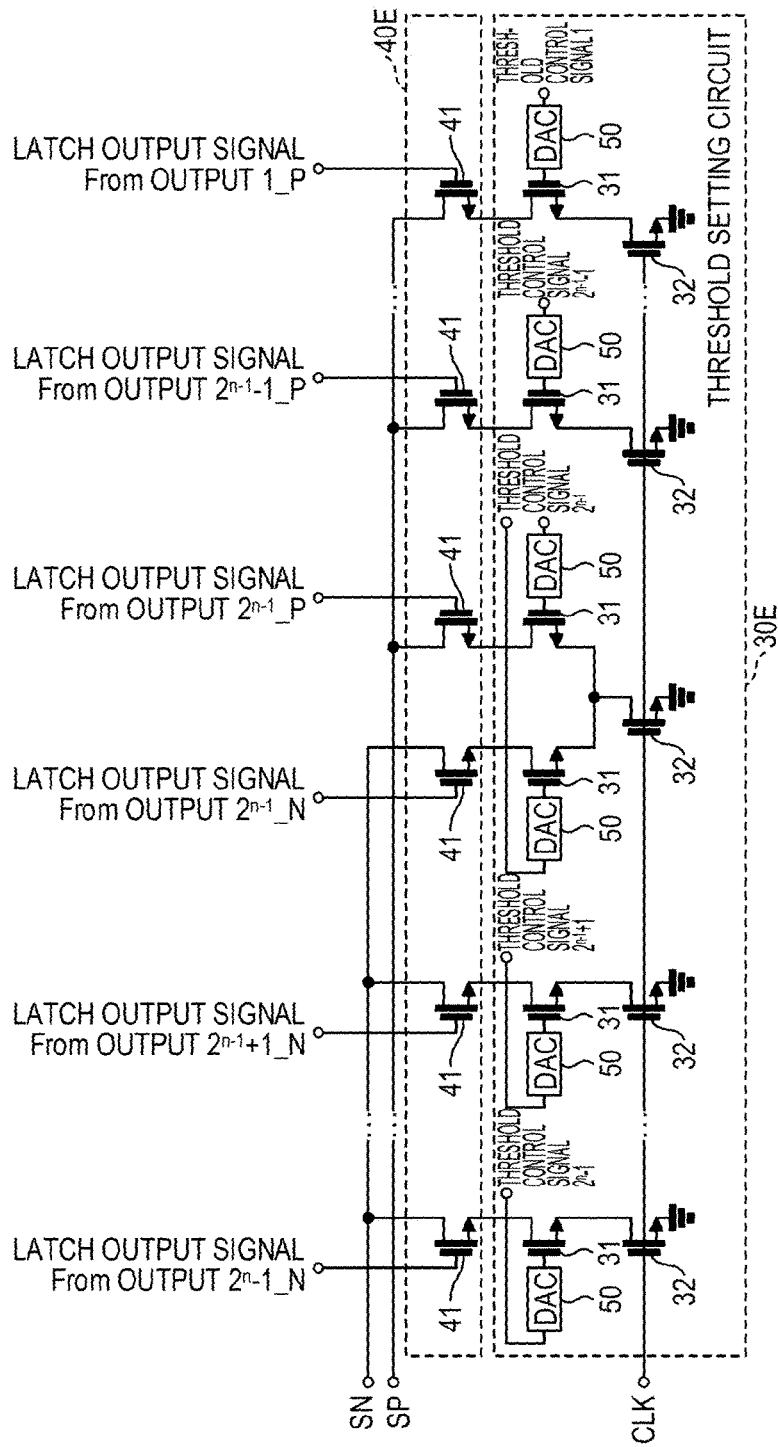
FIG. 22 is a diagram illustrating an example of the configuration of each of a switch circuit and a threshold setting circuit according to the fourth embodiment.

FIG. 22 is a diagram illustrating an example of the configuration of each of a switch circuit and a threshold setting circuit according to the fourth embodiment. A switch circuit 40E is an example of the switch circuit 40 and a threshold setting circuit 30E is an example of the threshold setting circuit 30. The comparator 10 according to the fourth embodiment is, for example, the comparator 10A or the comparator 10B described above.

However, in the even comparator 10e, the inputs of the clock signal CLK and the clock signal CLKX are as illustrated in FIG. 7 or 16. On the other hand, in the odd comparator 10o, the clock signal CLK illustrated in FIG. 7 or 16 is replaced with the clock signal CLKX and the clock signal CLKX illustrated in FIG. 7 or 16 is replaced with the clock signal CLK. In the even threshold setting circuit 30e, the input of the clock signal CLK is as illustrated in FIG. 22. On the other hand, in the odd threshold setting circuit 30o, the clock signal CLK illustrated in FIG. 22 is replaced with the clock signal CLKX.

In FIG. 22, the switch circuit 40E includes $2^n$ transistors 41 connected in parallel to the input stage 11 of the comparator 10. The threshold setting circuit 30E includes ($2^n-1$) transistors 32, $2^n$ threshold adjustment transistors 31 and $2^n$ DACs 50.

The threshold setting circuit 30E uses the DACs 50 that output a threshold control voltage which is changed linearly with respect to the digital threshold control signals Vc1 to Vc$2^n-1$. The threshold setting circuit 30E controls the gate of each transistor 31 connected in parallel to the input stage 11 by the threshold control voltage output from each DAC 50. Accordingly, since the DFE coefficient of the comparator 10 is changed linearly with respect to the digital threshold control signals Vc1 to Vc$2^n-1$, the decision threshold of the comparator 10 is able to be linearly changed. Therefore, since ISI is able to be further removed, the removal performance of ISI is able to be improved.

Fifth Embodiment

Figure 23:
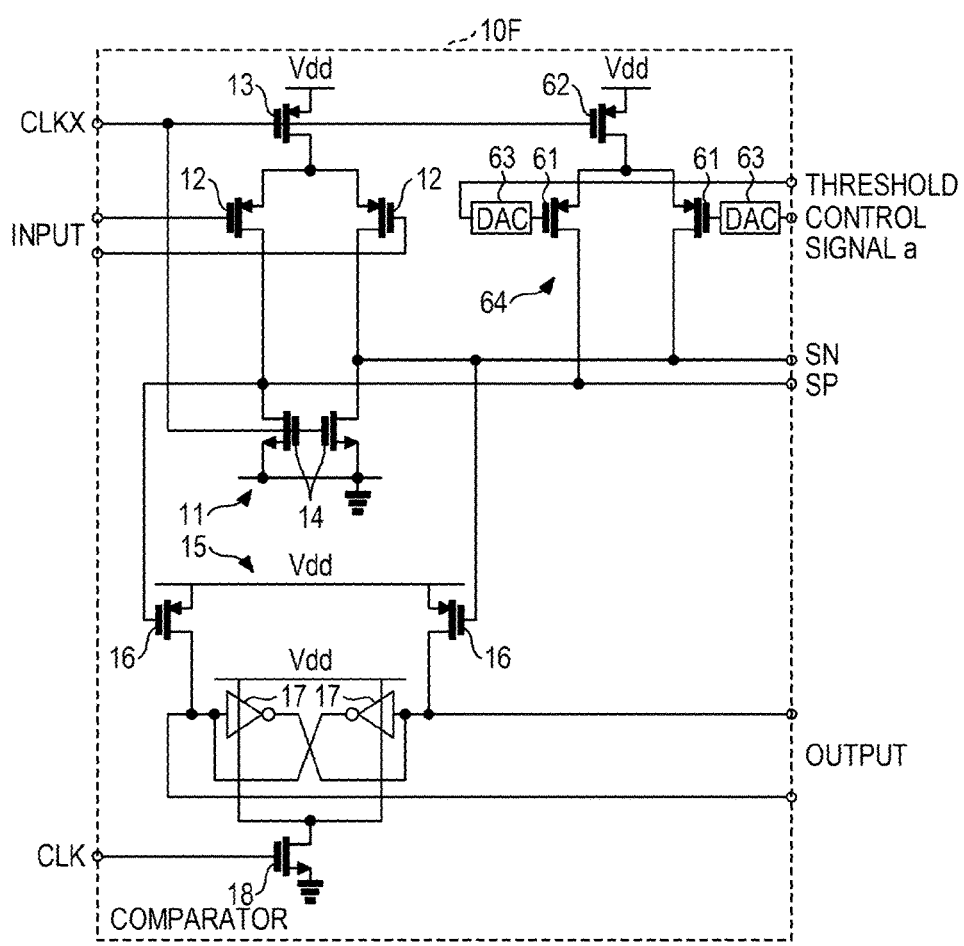
FIG. 23 is a diagram illustrating an example of the configuration of a comparator according to a fifth embodiment.

FIG. 23 is a diagram illustrating an example of the configuration of a comparator according to a fifth embodiment. Of the configurations and effects of the fifth embodiment, descriptions of configurations and effects similar to those of the above-described embodiments will be omitted by citing the above description.

In the first to fourth embodiments, the input stage 11 of each comparator 10 has a pair of transistors 12 which is an N-channel differential pair. On the other hand, in the fifth embodiment, the input stage 11 of a comparator 10F has a pair of transistors 12 which is a P-channel differential pair. When the input stage 11 compares the data signals P and N with the P-channel differential pair, each comparator 10 is able to operate even when the operating points of the input data signals P and N drop.

In FIG. 23, each of the transistors 12, 13, 16, 61, and 62 is a P-channel MOSFET. Each of the transistors 14 and 18 is an N-channel MOSFET.

Figure 24:
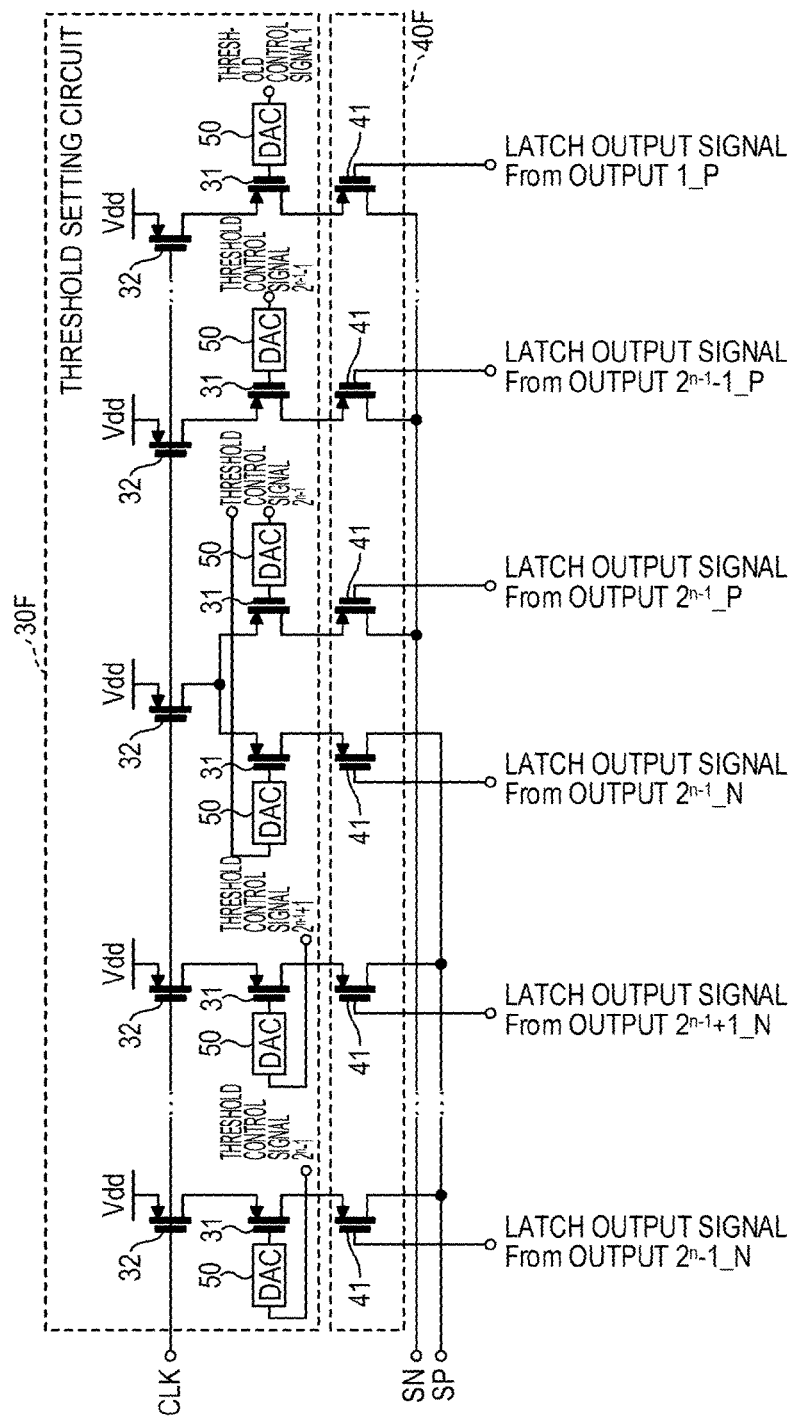
FIG. 24 is a diagram illustrating an example of the configuration of each of a switch circuit and a threshold setting circuit according to the fifth embodiment.

FIG. 24 is a diagram illustrating an example of the configuration of each of a switch circuit and a threshold setting circuit according to the fifth embodiment. In the fifth embodiment, since the input stage 11 of the comparator 10F compares the data signals P and N with the P-channel differential pair, each of the transistors 31 and 32 of the threshold setting circuit 30F and each transistor 41 of the switch circuit 40F are also a P-channel transistor.

Sixth Embodiment

Figure 25:
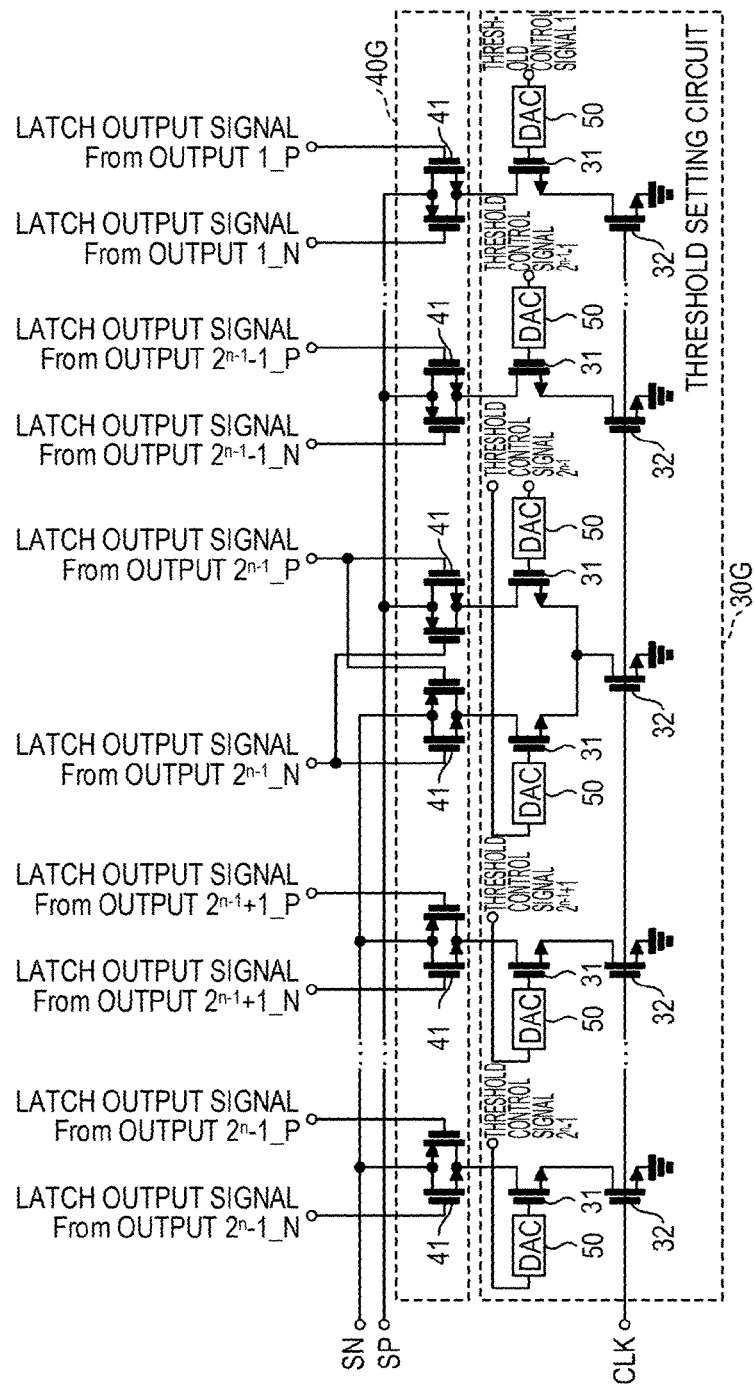
FIG. 25 is a diagram illustrating an example of the configuration of each of a switch circuit and a threshold setting circuit according to a sixth embodiment.

FIG. 25 is a diagram illustrating an example of the configuration of each of a switch circuit and a threshold setting circuit according to a sixth embodiment. Of the configurations and effects of the sixth embodiment, descriptions of configurations and effects similar to those of the above-described embodiments will be omitted by citing the above description.

In the sixth embodiment, each transistor 41 connecting a comparator 10 and a threshold setting circuit 30G is a complementary switch which is a combination of a P-channel transistor and an N-channel transistor. Accordingly, it is possible to reliably turn on or off each transistor 41 connecting the comparator 10 and the threshold setting circuit 30G even when the drain voltage of the nodes SN and SP or the transistors 31 of the threshold setting circuit 30G is at intermediate potential.

Seventh Embodiment

Figure 26:
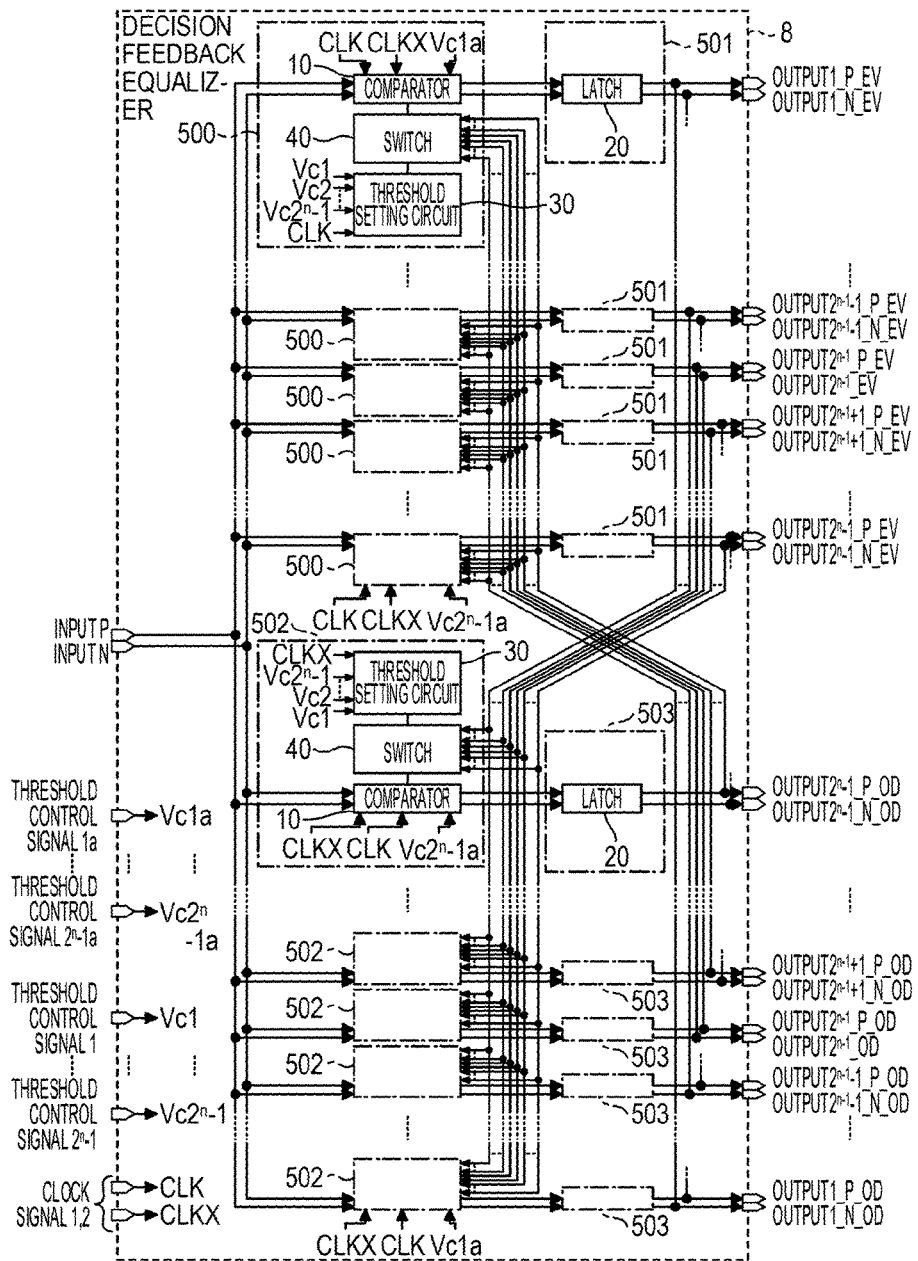
FIG. 26 is a diagram illustrating an example of the configuration of a decision feedback equalizer according to a seventh embodiment.

FIG. 26 is a diagram illustrating an example of the configuration of a decision feedback equalizer according to a seventh embodiment. Of the configurations and effects of the seventh embodiment, descriptions of configurations and effects similar to those of the above-described embodiments will be omitted by citing the above description.

In the seventh embodiment, each latch circuit 20 has a configuration (e.g., an RS latch circuit) that is not controlled by external clock signals CLK and CLKX. Thus, since no clock signal is applied to the latch circuit, it is possible to reduce the scale of a circuit that distributes a clock signal.

Eighth Embodiment

Figure 27:
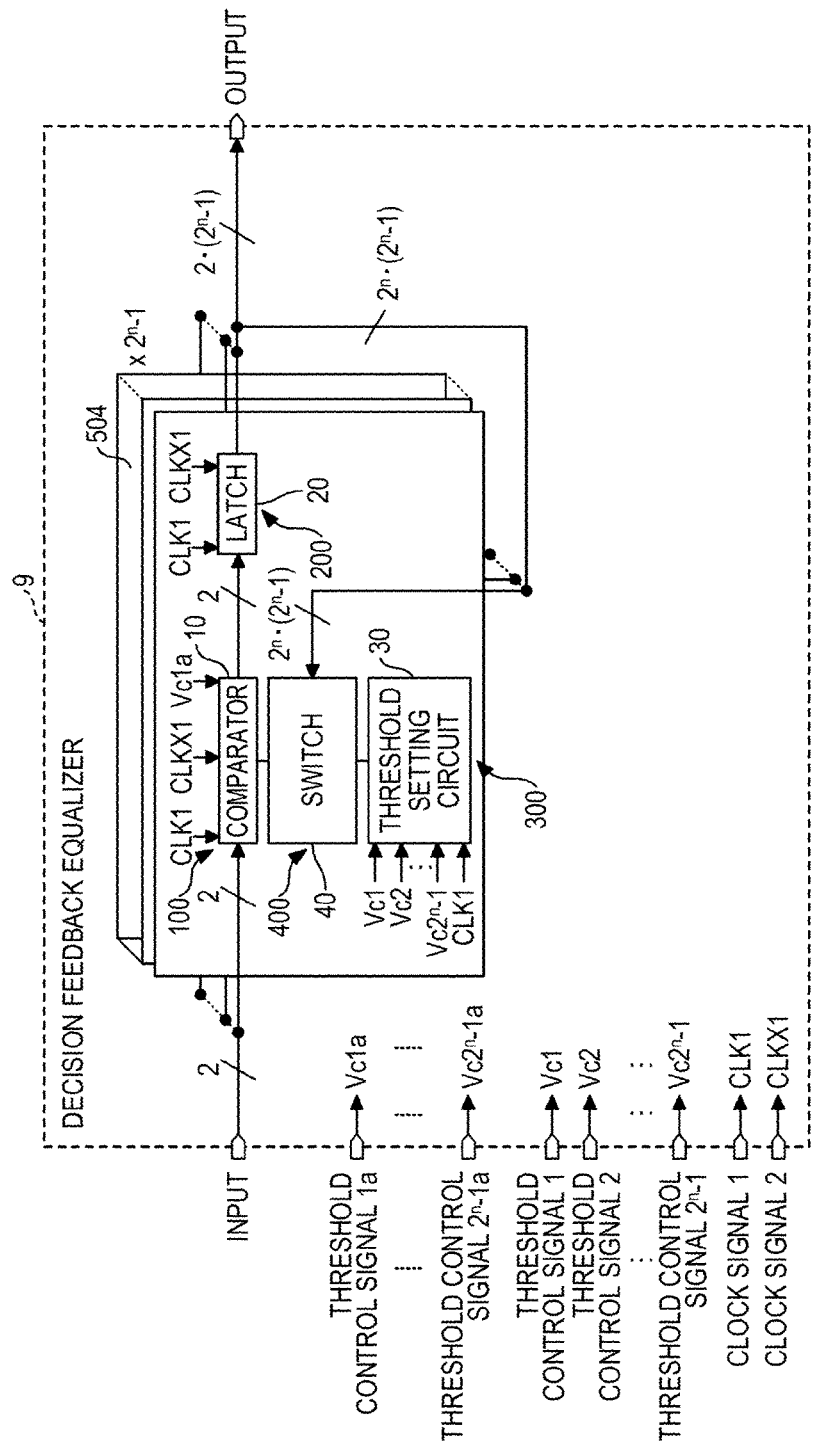
FIG. 27 is a diagram illustrating an example of the configuration of a decision feedback equalizer according to an eighth embodiment.

FIG. 27 is a diagram illustrating an example of the configuration of a decision feedback equalizer according to an eighth embodiment. Of the configurations and effects of the eighth embodiment, descriptions of configurations and effects similar to those of the above-described embodiments will be omitted by citing the above description.

In the first to seventh embodiments, the equalizer is a half rate DFE having a two-parallel time-interleave configuration operating in a time interleaving manner. In contrast, in the eighth embodiment, an equalizer 9 is a full rate DFE having no time-interleave configuration. Since the eighth embodiment adopts no time-interleave configuration, it is possible to reduce the circuit scale of the equalizer 9.

The equalizer 9 has a configuration for detecting each value of a $2^n$-value (n is a natural number) pulse amplitude modulation signal (PAM$2^n$ signal). The equalizer 9 includes $(2^n-1)$ equalization circuits 504 for detecting each value of the PAM$2^n$ signal. The equalizer 9 includes a comparison circuit 100, a latch circuit 200, a switch circuit 400, and a setting circuit 300.

The $(2^n-1)$ equalization circuits 504 each have one comparator 10, and the comparison circuit 100 includes $(2^n-1)$ comparators 10 combined with the $(2^n-1)$ equalization circuits 504. The comparators 10 have different decision thresholds. For example, a first comparator 10 has a first decision threshold between a first value and a second value of the PAM$2^n$ signal and a second comparator 10 has a second decision threshold between the second value and a third value of the PAM$2^n$ signal. The $(2^n-1)^{th}$ comparator 10 has a $(2^n-1)^{th}$ decision threshold between a $(2^n-1)^{th}$ value and a $(2^n)^{th}$ value of the PAM$2^n$ signal.

The $(2^n-1)$ equalization circuits 504 each have one latch 20, and the latch circuit 200 includes $(2^n-1)$ latches 20 combined with the $(2^n-1)$ equalization circuits 504. The latch circuit 200 includes $(2^n-1)$ latches 20 for latching the comparison result of the $(2^n-1)$ comparators 10.

The $(2^n-1)$ equalization circuits 504 each have one switch 40, and the switch circuit 400 includes $(2^n-1)$ switches 40 combined with the $(2^n-1)$ equalization circuits 504. The switch circuit 400 includes $(2^n-1)$ switches 40 that are on/off-controlled by output signals of the $(2^n-1)$ latches 20.

The $(2^n-1)$ equalization circuits 504 each have one threshold setting circuit 30, and the setting circuit 300 includes $(2^n-1)$ threshold setting circuits 30 combined with the $(2^n-1)$ equalization circuits 504. The setting circuit 300 includes $(2^n-1)$ threshold setting circuits 30 for setting the decision threshold of the $(2^n-1)$ comparators 10 in accordance with threshold control signals Vc1 to Vc$2^n-1$ supplied from the outside of the equalizer 9.

Each comparator 10 and each latch 20 operate in synchronization with a clock signal CLK1 and a clock signal CLKX1. The clock signal CLK1 and the clock signal CLKX1 are mutually inverted. Each threshold setting circuit 30 operates in synchronization with the clock signal CLK1 for driving the comparator 10.

Ninth Embodiment

Figure 28:
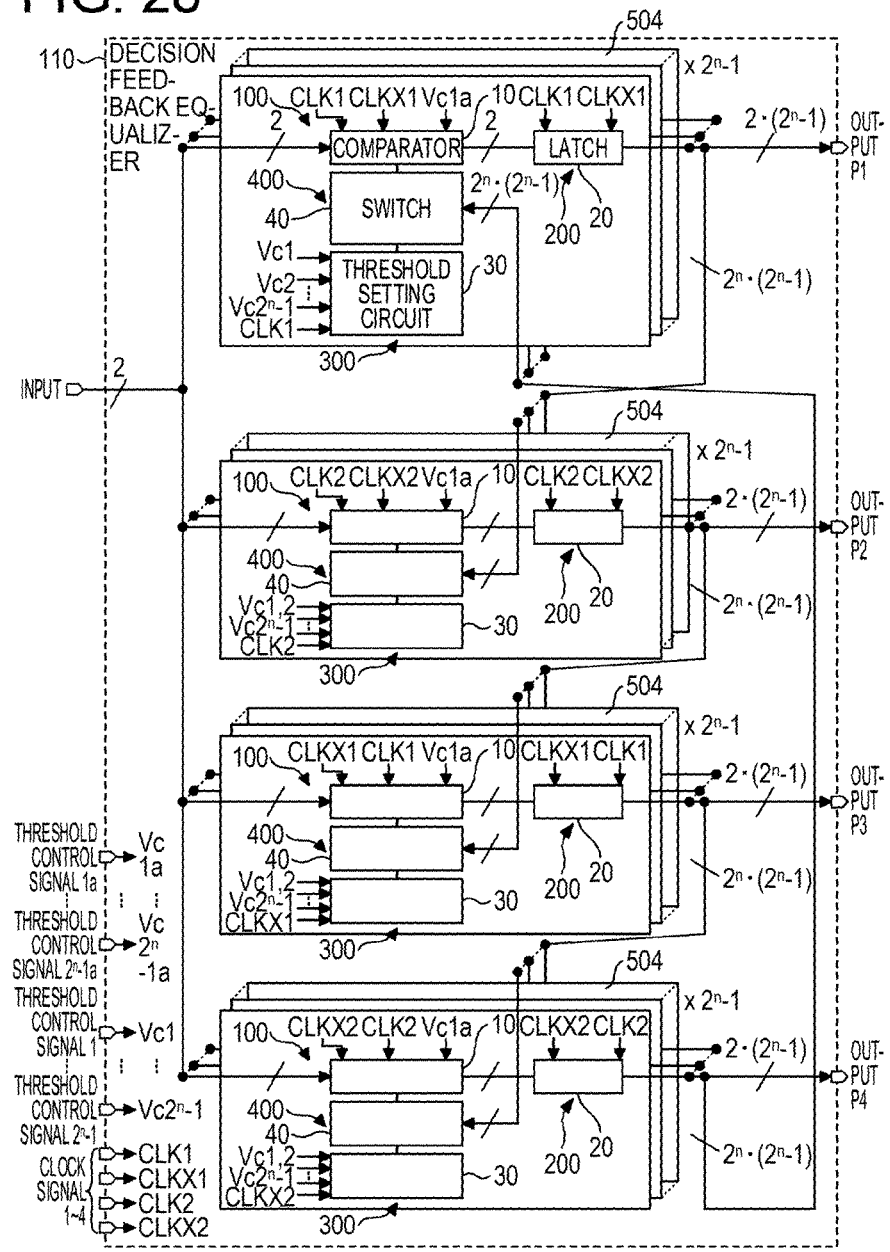
FIG. 28 is a diagram illustrating an example of the configuration of a decision feedback equalizer according to a ninth embodiment.

FIG. 28 is a diagram illustrating an example of the configuration of a decision feedback equalizer according to a ninth embodiment. Of the configurations and effects of the ninth embodiment, descriptions of configurations and effects similar to those of the above-described embodiments will be omitted by citing the above description.

In the first to eighth embodiments, the equalizer is a half rate DFE having a two-parallel time-interleave configuration. In contrast, in the ninth embodiment, an equalizer 110 is a quarter rate DFE having a four-parallel time-interleave configuration. Since the ninth embodiment adopts the four-parallel time-interleave configuration, it is possible to reduce the frequencies of the clock signals CLK and CLKX more than the two-parallel time-interleave configuration.

The equalizer 110 has a configuration for detecting each value of a $2^n$-value (n is a natural number) pulse amplitude modulation signal (PAM$2^n$ signal). The equalizer 110 includes ($2^n$-1) four-parallel equalization circuits 504 for detecting each value of the PAM$2^n$ signal. The equalizer 110 includes a comparison circuit 100, a latch circuit 200, a switch circuit 400 and a setting circuit 300.

A latch output signal of a first group of ($2^n$-1) equalization circuits 504 is fed back to each switch 40 of the switch circuit 400 of a second group of ($2^n$-1) equalization circuits 504. A latch output signal of the second group of ($2^n$-1) equalization circuits 504 is fed back to each switch 40 of the switch circuit 400 of a third group of ($2^n$-1) equalization circuits 504. A latch output signal of the third group of ($2^n$-1) equalization circuits 504 is fed back to each switch 40 of the switch circuit 400 of a fourth group of ($2^n$-1) equalization circuits 504. A latch output signal of the fourth group of ($2^n$-1) equalization circuits 504 is fed back to each switch 40 of the switch circuit 400 of the first group of ($2^n$-1) equalization circuits 504.

Each comparator 10 and each latch 20 of the first group and the third group operate in synchronization with a clock signal CLK1 and a clock signal CLKX1. The clock signal CLK1 and the clock signal CLKX1 are mutually inverted. Each threshold setting circuit 30 of the first group operates in synchronization with the clock signal CLK1 for driving the comparator 10 of the first group. Each threshold setting circuit 30 of the third group operates in synchronization with the clock signal CLKX1 for driving the comparator 10 of the third group.

Each comparator 10 and each latch 20 of the second group and the fourth group operate in synchronization with a clock signal CLK2 and a clock signal CLKX2. The clock signal CLK2 and the clock signal CLKX2 are mutually inverted. Each threshold setting circuit 30 of the second group operates in synchronization with the clock signal CLK2 for driving the comparator 10 of the second group. Each threshold setting circuit 30 of the fourth group operates in synchronization with the clock signal CLKX2 for driving the comparator 10 of the fourth group.

A decision feedback equalizer and an interconnect circuit have been described above by way of embodiments. However, the present disclosure is not limited to the above embodiments. Various modifications and improvements such as combination or replacement with some or all of other embodiments are possible within the scope of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A decision feedback equalizer comprising:
    a comparison circuit configured to compare a value indicated as $2^n$ of a pulse amplitude modulated signal with a threshold value, wherein n is an integer of 2 or more;
    a latch circuit configured to retain data of a comparison result of the comparison circuit;
    a decoder configured to decode the retained data by the latch circuit; and
    a setting circuit on/off-controlled by the retained data fed back from the latch circuit and configured to set the threshold value based on the retained data fed back from the latch circuit,
    the latch circuit is disposed between the comparison circuit and the decoder.

2. The decision feedback equalizer according to claim 1, wherein the comparison circuit is configured to include ($2^n$-1) or ($2\times(2^n$-1)) comparators to compare the value indicated as $2^n$ of the pulse amplitude modulated signal,
    wherein the latch circuit is configured to include ($2^n$-1) or ($2\times(2^n$-1)) latches to retain the data of the comparison result of the ($2^n$-1) or ($2\times(2^n$-1)) comparators, and
    wherein the setting circuit is configured to include ($2^n$-1) or ($2\times(2^n$-1)) threshold setting circuits to set the threshold value of the ($2^n$-1) or ($2\times(2^n$-1)) comparators and include ($2^n$-1) or ($2\times(2^n$-1)) switch circuits to be on/off-controlled by the retained data fed back from the ($2^n$-1) or ($2\times(2^n$-1)) latches.

3. The decision feedback equalizer according to claim 2, wherein transistors of the ($2^n$-1) or ($2\times(2^n$-1)) switch circuits have a same size.

4. The decision feedback equalizer according to claim 2, wherein the ($2^n$-1) or ($2\times(2^n$-1)) threshold setting circuits coupled to the ($2^n$-1) or ($2\times(2^n$-1)) switch circuits, respectively, are coupled to the ($2^n$-1) or ($2\times(2^n$-1)) comparators, respectively, in parallel and operate in synchronization with a clock signal for driving the ($2^n$-1) or ($2\times(2^n$-1)) comparators.

5. The decision feedback equalizer according to claim 2, wherein each of the ($2^n$-1) or ($2\times(2^n$-1)) threshold setting circuits is configured to include a threshold adjustment transistor coupled to any one of the ($2^n$-1) or ($2\times(2^n$-1)) switch circuits, in parallel, the threshold adjustment transistor being controlled according to a control signal.

6. The decision feedback equalizer according to claim 5, wherein the threshold adjustment transistor is controlled with a control voltage changed linearly with respect to the control signal.

7. The decision feedback equalizer according to claim 5, wherein each of the ($2^n$-1) or ($2\times(2^n$-1)) threshold setting circuits includes a digital-to-analog converter to convert the control signal of digital into a control signal of analogue.

8. The decision feedback equalizer according to claim 1, wherein the comparison circuit is configured to include an offset adjustment circuit to adjust an offset of the threshold value.

9. The decision feedback equalizer according to claim 1, wherein the comparison circuit is configured to include a pair of transistors to form a P-channel differential pair.

10. The decision feedback equalizer according to claim 1, wherein the setting circuit is configured to include a complementary switch to be on/off-controlled by the retained data fed back from the latch circuit.

11. The decision feedback equalizer according to claim 1, wherein the latch circuit is configured to be not controlled by a clock signal.

12. The decision feedback equalizer according to claim 1, wherein the decision feedback equalizer has a time-interleave configuration.

13. The decision feedback equalizer according to claim 12, wherein the decision feedback equalizer has a two-parallel or four-parallel time-interleave configuration.

14. The decision feedback equalizer according to claim 1, wherein n is 2.

15. The decision feedback equalizer according to claim 1, wherein n is 3.

16. An interconnect circuit comprising:
- a transmission device configured to transmit a signal having a value indicated as $2^n$ of a pulse amplitude modulated signal; and
- a reception device configured to include a decision feedback equalizer to shape a signal transmitted from the transmission device, the decision feedback equalizer including:
- a comparison circuit configured to compare a value of the signal with a threshold value, wherein n is an integer of 2 or more,
- a latch circuit configured to retain data of a comparison result of the comparison circuit,
- a decoder configured to decode the retained data by the latch circuit, and
- a setting circuit on/off-controlled by the retained data fed back from the latch circuit and configured to set the threshold value based on the retained data fed back from the latch circuit,
- the latch circuit is disposed between the comparison circuit and the decoder.

* * * * *